United States Patent
Tamaru

(10) Patent No.: US 7,616,837 B2
(45) Date of Patent: Nov. 10, 2009

(54) IMAGE PROCESSING APPARATUS, IMAGE PROCESSING METHOD, PROGRAM, AND STORAGE MEDIUM

(75) Inventor: Jun Tamaru, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 425 days.

(21) Appl. No.: 11/561,476

(22) Filed: Nov. 20, 2006

(65) Prior Publication Data

US 2007/0171453 A1   Jul. 26, 2007

(30) Foreign Application Priority Data

Nov. 24, 2005   (JP) .............................. 2005-339211
May 31, 2006    (JP) .............................. 2006-152762

(51) Int. Cl.
    *G06K 9/32* (2006.01)
(52) U.S. Cl. ..................... 382/294; 162/110; 283/113; 358/3.28; 713/176
(58) Field of Classification Search ................. 162/110; 283/113; 358/3.28; 382/294; 713/176
    See application file for complete search history.

(56) References Cited

U.S. PATENT DOCUMENTS

| | | | |
|---|---|---|---|
| 6,125,211 A * | 9/2000 | Lu et al. ..................... 382/241 |
| 6,493,470 B1 | 12/2002 | Ikeda et al. |
| 6,915,001 B2 * | 7/2005 | Tachibana et al. ........... 382/100 |
| 6,922,196 B1 * | 7/2005 | Rao et al. ................... 345/596 |
| 7,039,215 B2 | 5/2006 | Suzaki |
| 7,106,884 B2 | 9/2006 | Tamaru |
| 7,190,807 B2 | 3/2007 | Tamaru et al. |
| 7,209,572 B2 | 4/2007 | Iwamura et al. |
| 2004/0141631 A1 | 7/2004 | Iwamura et al. |
| 2004/0142096 A1 | 7/2004 | Iwamura et al. |
| 2006/0126889 A1 * | 6/2006 | Nakamura et al. .......... 382/100 |
| 2006/0268311 A1 | 11/2006 | Tamaru |
| 2007/0127771 A1 | 6/2007 | Kameda et al. |

FOREIGN PATENT DOCUMENTS

| | | |
|---|---|---|
| JP | 07-231384 | 8/1995 |
| JP | 09-006914 | 1/1997 |
| JP | 11-245473 | 9/1999 |
| JP | 2001-197297 | 7/2001 |
| JP | 2001-238075 | 8/2001 |
| JP | 2001-324898 | 11/2001 |
| JP | 2001-346032 | 12/2001 |
| JP | 2002044408 A * | 2/2002 |
| JP | 2002-354221 | 12/2002 |
| JP | 3628312 | 12/2004 |
| JP | 2005-295458 | 10/2005 |

* cited by examiner

*Primary Examiner*—Andrew W Johns
*Assistant Examiner*—Gregory F Cunningham
(74) *Attorney, Agent, or Firm*—Fitzpatrick, Cella, Harper & Scinto

(57) ABSTRACT

A predetermined region set on a grayscale image is divided into rectangles each having a predetermined size (S706), and piled patterns which hold the accumulated values of pixel values at identical pixel positions upon piling up the divided rectangles is generated (S707). An alignment pattern is generated by calculating the logical sum of respective bit expression patterns (S708). A peak position which matches the alignment pattern on the piled patterns best is obtained (S710). The position of the predetermined region is corrected based on the peak position, and the predetermined region after correction is divided into rectangles each having the predetermined size (S711) Patterns in the divided rectangles are recognized (S712). Embedding information corresponding to each recognized pattern is specified (S713).

10 Claims, 23 Drawing Sheets

F I G. 5A    F I G. 5B
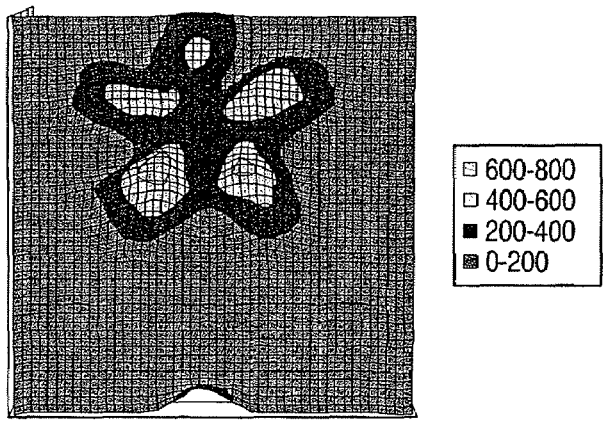 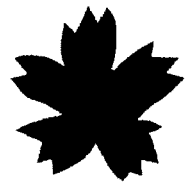
F I G. 5C
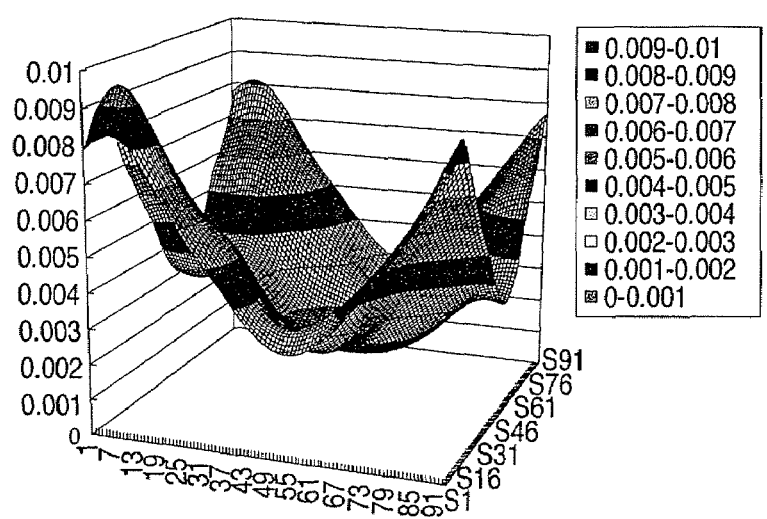

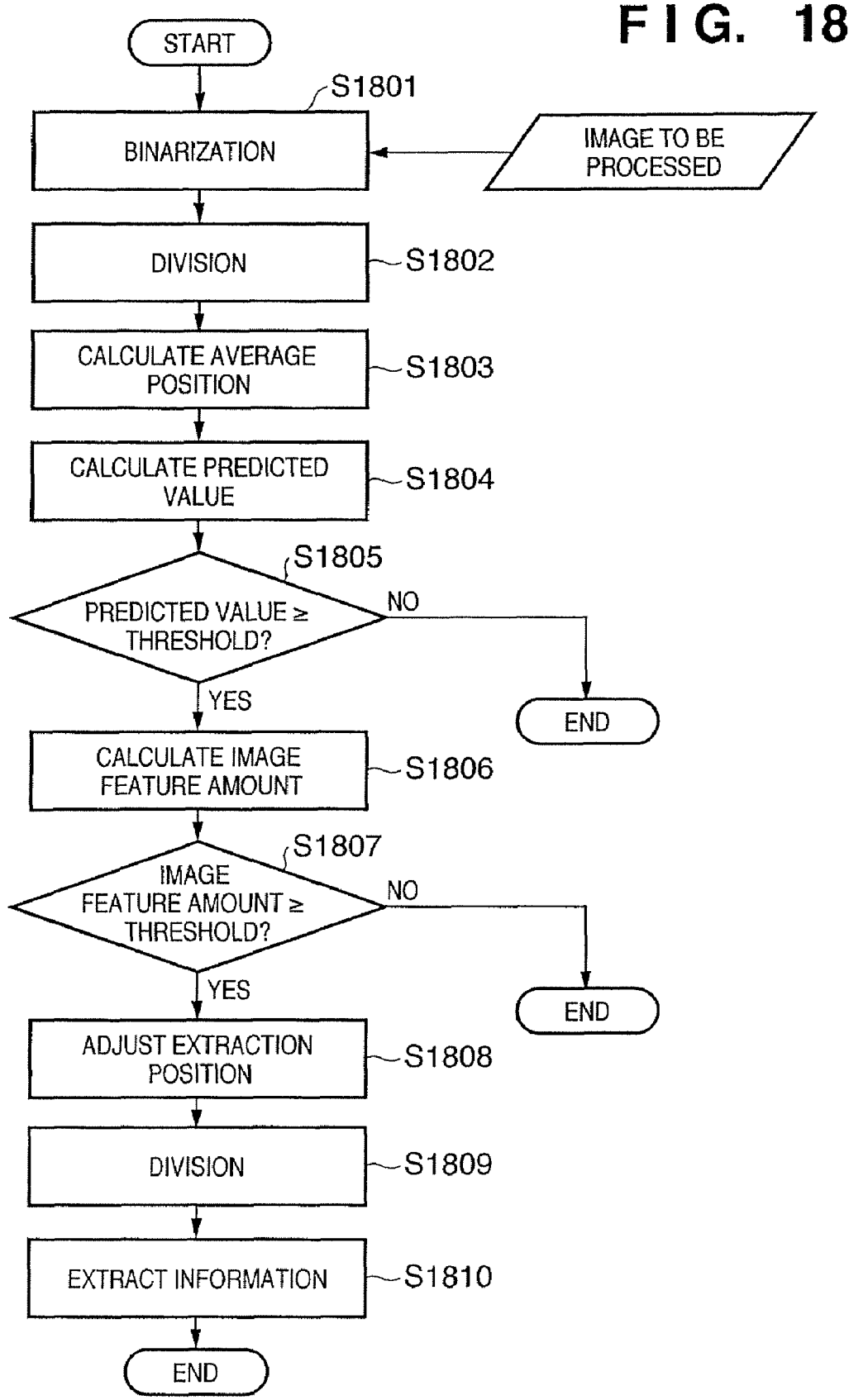

F I G. 21
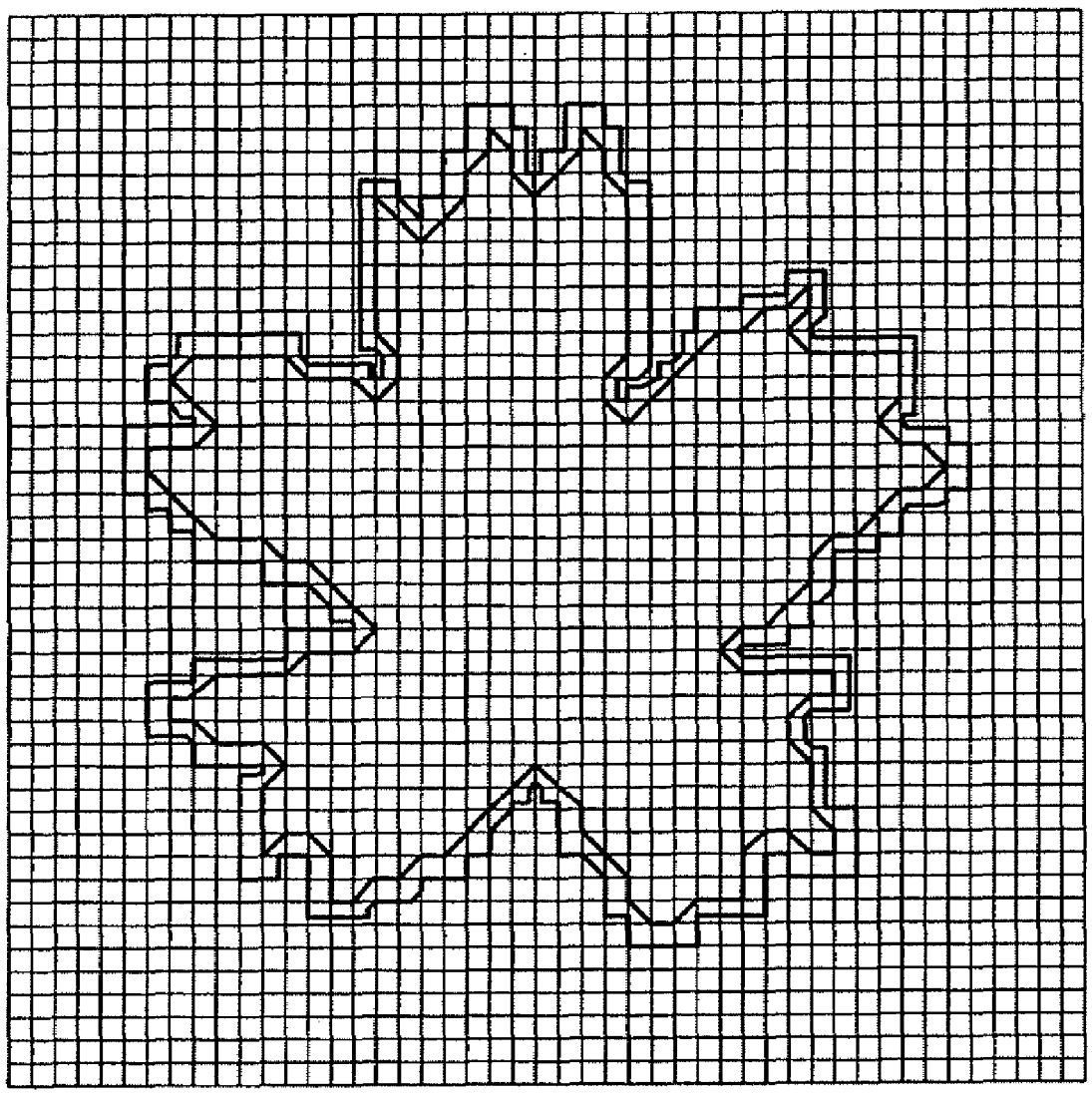

IMAGE PROCESSING APPARATUS, IMAGE PROCESSING METHOD, PROGRAM, AND STORAGE MEDIUM

BACKGROUND OF THE INVENTION

1. Field of the Invention

The present invention relates to an image processing apparatus, image processing method, program, and storage medium.

2. Description of the Related Art

A technique for implementing a copy-forgery-inhibited pattern has been disclosed (see Japanese Patent Laid-Open No. 07-231384, Japanese Patent Laid-Open No. 11-245473, Japanese Patent Laid-Open No. 2001-197297, Japanese Patent Laid-Open No. 2001-238075, and Japanese Patent Laid-Open No. 2001-324898). The copy-forgery-inhibited pattern includes a remaining region and a vanishing region. Within the remaining region, dots having a large size (to be referred to as large dots hereinafter: a size of about 160 μm 160 μm) are formed. Within the vanishing region, dots having a smaller size (to be referred to as small dots hereinafter: a size of about 42 μn 42 μm) are formed. The reflection density per unit area of the remaining region is largely similar to that of the vanishing region. In order to make the reflection densities of the two regions largely similar to each other, a relatively small number of large dots are formed on the remaining region, and a relatively large number of small dots are formed on the vanishing region.

The region where large dots are formed has the shape of the character string "invalid" or a string of similar meaning, as shown in FIG. 23. Since the reflection density per unit area of the remaining region is largely similar to that of the vanishing region, a person cannot clearly recognize the character string "invalid" or the like when viewing the copy-forgery-inhibited pattern.

When a copy is made of this copy-forgery-inhibited pattern, small dots are not accurately reproduced on the copy, while large dots are accurately reproduced. As a result, the character string "invalid" or one of similar meaning are clearly recognized by the human eye.

This copy-forgery-inhibited pattern includes blank patterns (see FIG. 23). This specification calls each such blank pattern a camouflage pattern. In FIG. 23, each camouflage pattern has a ○ shape and, hence, the camouflage pattern is a ○-shaped blank pattern. When the copy-forgery-inhibited pattern includes such camouflage patterns, these patterns fool the human eye, and the boundary between the remaining region and vanishing region can hardly be recognized.

A technique for embedding digital data in addition to a copy-forgery-inhibited pattern has also be disclosed (see Japanese Patent Laid-Open No. 2001-346032). Using this technique, a tracking function can be implemented simultaneously with the copy-forgery-inhibited pattern by embedding the ID of a printer or user.

Furthermore, a technique for embedding digital data on a printed document has been disclosed (see Japanese Patent No. 3628312). Although it does not make mention of a copy-forgery-inhibited patterns, Japanese Patent No. 3628312 discloses a technique for expressing information on a paper sheet, and this technique has a characteristic that two-dimensional barcodes do not have. The two-dimensional barcodes require to having a given size for expressing data. This characteristic of Japanese Patent No. 3628312 lies in the fact that digital data can be embedded such that it is superimposed on a region such as text, a table, or the like of a document. The two-dimensional barcodes do not have the characteristic.

As a known method for recognizing a boundary, character extraction based on projection or the like is known. Even when using this technique, multiple types of arranged patterns cannot be recognized. Furthermore, a character extraction technique based on projection cannot be applied to the detection of patterns from an image upon which multiple types of patterns are arranged. This is because the character extraction technique extracts characters assuming that a white pixel exists between neighboring character patterns.

A digital watermark extraction technique which is conventionally used includes three processing steps, as shown in FIG. 8. FIG. 8 is a flowchart showing the processing of the conventional digital watermark extraction technique. Referring to FIG. 8, the presence/absence of digital watermark information in input data is checked in step 801. As processing relating to determination of presence/absence of digital watermark information, statistical processing such as patchwork or the like is known. In step 802, processing for determining the embedded position of the digital watermark information is executed. In step 803, processing for extracting the digital watermark information embedded at the embedded position is executed. However, various methods for specifying the position of digital watermark information are available. In a digital watermark using camouflage of a copy-forgery-inhibited pattern, peaks may be used on a Fourier plane after a two-dimensional Fourier transformation. Finally, the digital watermark information extraction technique extracts the digital watermark information, using pattern recognition, statistical processing, and the like.

The present invention has been made in consideration of the aforementioned problems, and has as its object to provide a technique for detecting simpler the boundary of multiple types of patterns, which are arranged in a tiled fashion.

SUMMARY OF THE INVENTION

In order to achieve an object of the present invention, for example, an image processing apparatus of the present invention comprises the following arrangement.

That is, an image processing apparatus for specifying positions of a plurality of types of patterns from a target image on which the respective patterns are laid out at a given interval, comprising:

a division unit adapted to divide the target image into a plurality of divided images of a size of the given interval;

a pile unit adapted to pile up the plurality of divided images obtained by the division unit so as to obtain a piled image; and a specifying unit adapted to specify positions of the plurality of types of patterns in the target image on the basis of an alignment pattern obtained by compositing the plurality of types of patterns and the piled image obtained by the pile unit.

In order to achieve an object of the present invention, for example, an image processing apparatus of the present invention comprises the following arrangement.

That is, an image processing apparatus for specifying positions of a plurality of types of patterns from a target image on which the respective patterns are laid out, comprising:

a division unit adapted to divide the target image to obtain a plurality of divided images;

a pile unit adapted to pile up the plurality of divided images obtained by the division unit so as to obtain a piled image; and a specifying unit adapted to specify positions of the plurality of types of patterns in the target image on the basis of the piled image.

In order to achieve an object of the present invention, for example, an image processing apparatus of the present invention comprises the following arrangement.

That is, an image processing apparatus for specifying positions of a plurality of types of patterns from a target image on which the respective patterns are laid out, comprising:

a generation unit adapted to generate an alignment pattern by compositing the plurality of types of patterns; and a specifying unit adapted to specify positions of the plurality of types of patterns in the target image on the basis of the alignment pattern generated by the generation unit.

In order to achieve an object of the present invention, for example, an image processing method of the present invention comprises the following arrangement.

That is, an image processing method for specifying positions of a plurality of types of patterns from a target image on which the respective patterns are laid out at a given interval, comprising:

a division step of dividing the target image into a plurality of divided images of a size of the given interval;

a pile step of piling up the plurality of divided images obtained in the division step so as to obtain a piled image; and a specifying step of specifying positions of the plurality of types of patterns in the target image on the basis of an alignment pattern obtained by compositing the plurality of types of patterns and the piled image obtained in the pile step.

In order to achieve an object of the present invention, for example, an image processing method of the present invention comprises the following arrangement.

That is, an image processing method for specifying positions of a plurality of types of patterns from a target image on which the respective patterns are laid out, comprising:

a division step of dividing the target image to obtain a plurality of divided images;

a pile step of pile up the plurality of divided images obtained in the division step so as to obtain a piled image; and a specifying step of specifying positions of the plurality of types of patterns in the target image on the basis of the piled image.

In order to achieve an object of the present invention, for example, an image processing method of the present invention comprises the following arrangement.

That is, an image processing method for specifying positions of a plurality of types of patterns from a target image on which the respective patterns are laid out, comprising:

a generation step of generating an alignment pattern by compositing the plurality of types of patterns; and a specifying step of specifying positions of the plurality of types of patterns in the target image on the basis of the alignment pattern generated in the generation step.

Further features of the present invention will become apparent from the following description of exemplary embodiments with reference to the attached drawings.

BRIEF DESCRIPTION OF THE DRAWINGS

FIG. 5A shows an example of piled patterns;

FIG. 5B shows an example of an alignment pattern;

FIG. 5C shows the result of matched filter processing;

FIG. 18 is a flowchart of the processing to be executed by an extracting device according to the third embodiment of the present invention;

FIG. 21 shows an example of an alignment pattern;

DESCRIPTION OF THE EMBODIMENTS

The present invention will be described in detail hereinafter by way of its preferred embodiments with reference to the accompanying drawings.

First Embodiment

Figure 1:
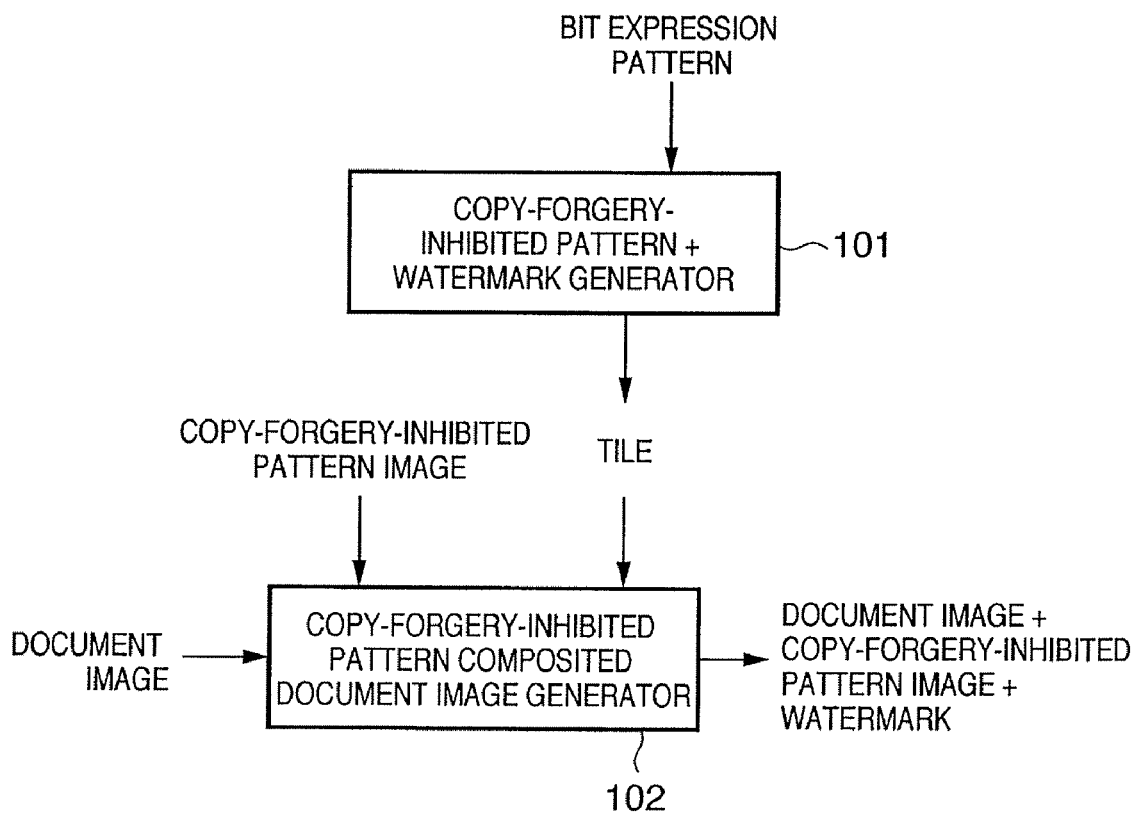
FIG. 1 is a block diagram showing the functional arrangement of an embedding device for embedding a copy-forgery-inhibited pattern in an image.

FIG. 1 is a block diagram showing the functional arrangement of an embedding device for embedding a copy-forgery-inhibited pattern in an image. As shown in FIG. 1, the embedding device according to this embodiment comprises a copy-forgery-inhibited pattern+watermark generator 101 and a copy-forgery-inhibited pattern composited document image generator 102.

Figure 4C:
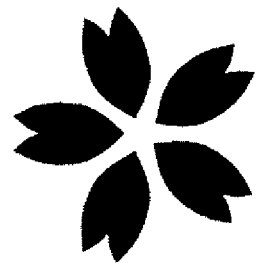
FIGS. 4A to 4C show bit expression patterns used in the first embodiment of the present invention.
Figure 4B:
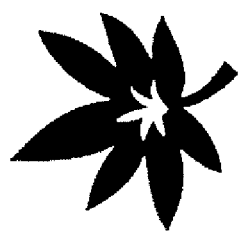
Figure 4A:

The copy-forgery-inhibited pattern+watermark generator 101 generates a camouflage pattern group using input bit expression patterns. The bit expression pattern expresses a numerical value to be embedded (embedding information) as a pattern. FIGS. 4A to 4C show bit expression patterns used in this embodiment. FIG. 4A shows a star-shaped bit expression pattern, FIG. 4B shows a maple-leaf-shaped bit expression pattern, and FIG. 4C shows a cherry-blossom-shaped bit expression pattern. In this embodiment, assume that these patterns respectively express "0", "1", and "2". Each bit expression pattern is a black pattern.

The copy-forgery-inhibited pattern+watermark generator 101 juxtaposes the bit expression patterns as black patterns at equal intervals (this interval will be referred to as z hereinafter) in accordance with an information sequence to be embedded. The interval means the distance between the central points of neighboring bit expression patterns. If the information sequence to be embedded is "0210", the generator 101 juxtaposes the bit expression patterns in the order of "star-shaped pattern", "cherry-blossom-shaped pattern", "maple-leaf -shaped pattern", and "star-shaped pattern".

In this specification, a pattern group generated by juxtaposing a plurality of bit expression patterns to express one information sequence to be embedded is called a "tile". When the bit expression pattern has a size of 1 cm×1 cm, and an information sequence to be embedded requires 36 bits, one tile often has a size of 6 cm×6 cm or 3 cm×12 cm. In this specification, tiles generated in this way are laid out on an A4-size region, thus generating a tile group.

The copy-forgery-inhibited pattern+watermark generator 101 outputs the tile group generated in this way to the copy-forgery-inhibited pattern composited document image generator 102. The copy-forgery-inhibited pattern composited document image generator 102 acquires this tile group from the copy-forgery-inhibited pattern+watermark generator 101, and also acquires copy-forgery-inhibited pattern data (A4-size image data having a remaining region on which large dots are formed, and a vanishing region on which small dots are formed), and A4-size document image data.

Figure 23:
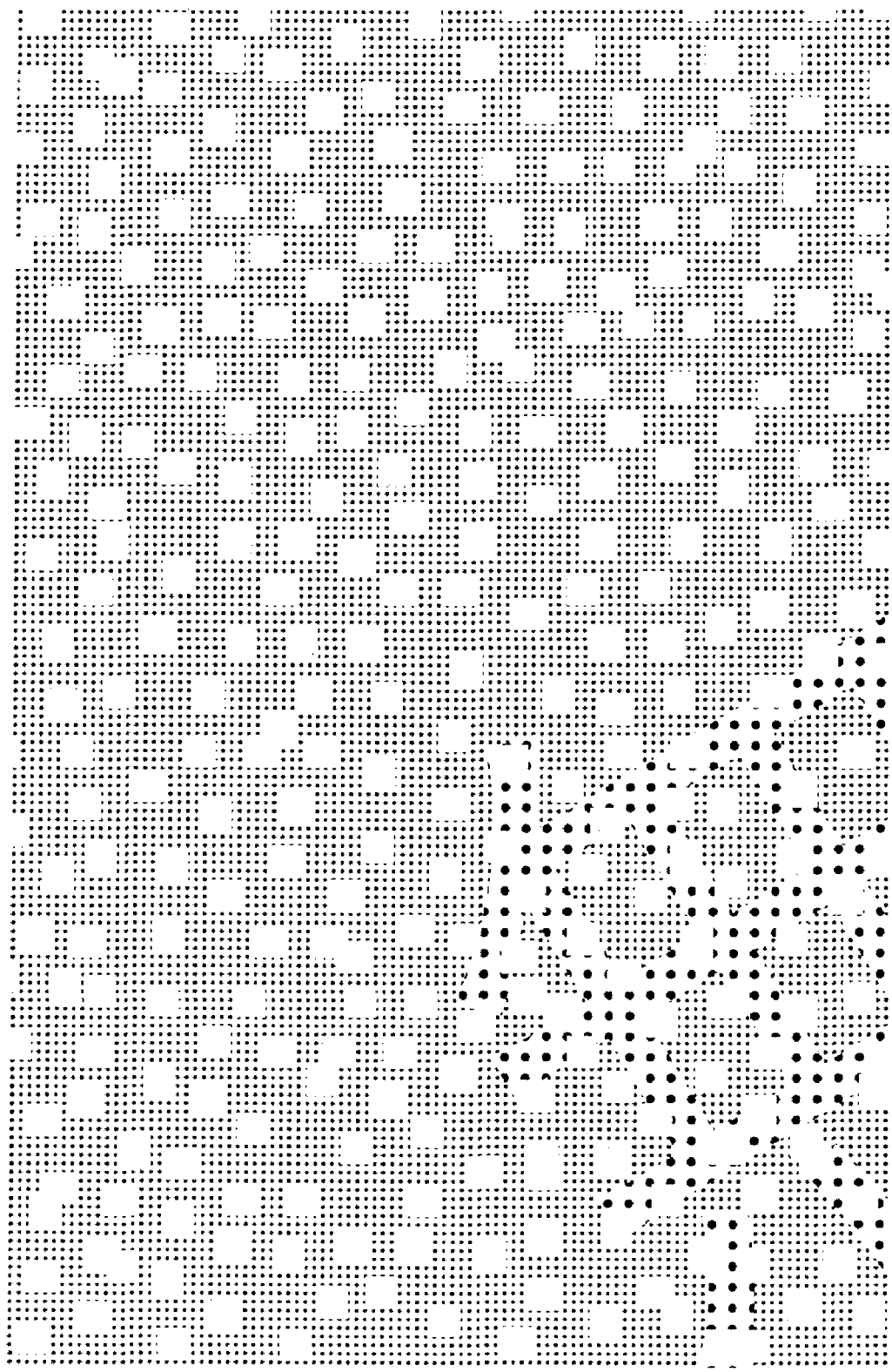
FIG. 23 shows an example of an image including camouflage patterns obtained as a result of clipping a tile group from a copy-forgery-inhibited pattern image.

The processing to be executed after the copy-forgery-inhibited pattern composited document image generator 102 acquires the above three data will be described below. The copy-forgery-inhibited pattern composited document image generator 102 clips the tile group from the copy-forgery-inhibited pattern image. As a result, an image shown in FIG. 23 is obtained. Note that each of blank patterns shown in FIG. 23 is called a camouflage pattern in this specification. That is, a pattern obtained by inverting the bit expression pattern as a black pattern is a camouflage pattern.

The copy-forgery-inhibited pattern composited document image generator 102 composites the copy-forgery-inhibited pattern image in a blank part of the document image data. An image obtained by composition will be referred to as an image to be processed hereinafter.

Figure 2:
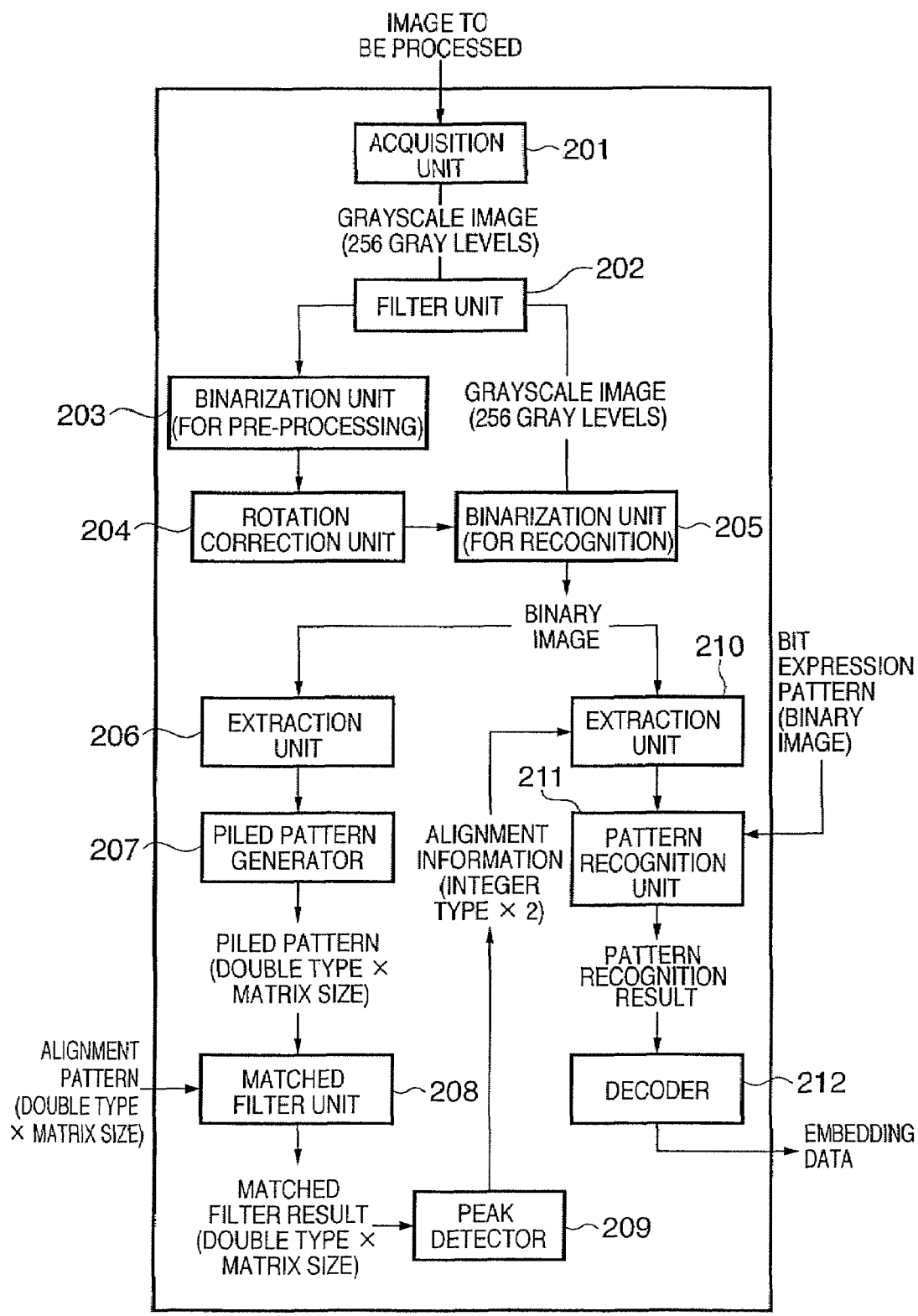
FIG. 2 is a block diagram showing the functional arrangement of an extracting device according to the first embodiment of the present invention.

An extracting device which extracts the bit expression patterns from this image to be processed will be described below. FIG. 2 is a block diagram showing the functional arrangement of an extracting device according to this embodiment.

An acquisition unit 201 acquires data as a result of scanning a print medium (paper sheet or the like) on which the image to be processed is printed using a scanner or the like. Assume that the acquired image data is a 256-level grayscale image.

The acquisition unit 201 outputs this grayscale image to a filter unit 202, which applies low-pass filter processing using a low-pass filter to this grayscale image. With this processing, the filter unit 202 can set the remaining region and vanishing region as regions having the same density. The filter unit 202 outputs the grayscale image that has undergone the low-pass filter processing to binarization units 203 and 205.

The binarization unit 203 applies binarization processing to the input grayscale image to correct any skew and rotation upon inputting a print to the scanner. More specifically, the binarization unit 203 executes binarization processing for erasing a background such as the copy-forgery-inhibited pattern and the like while leaving text as a foreground. A rotation correction unit 204 executes processing for detecting a skew and rotation of a document from a text part on the binary image, and correcting the skew and direction of the grayscale image to be input to the binarization unit 205. This correction uses a technique disclosed in, e.g., Japanese Patent Laid-Open No. 9-6914.

On the other hand, the binarization unit 205 applies binarization processing to the input grayscale image (which has undergone correction of the skew and direction by the rotation correction unit 204). More specifically, the binarization unit 205 applies the binarization processing to emphasize the camouflage patterns.

Figure 3B:
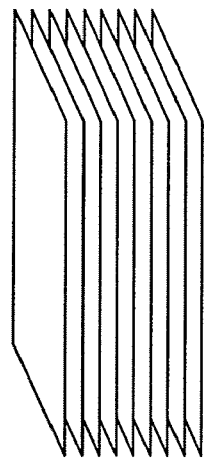
FIG. 3B shows piled patterns.
Figure 3D:
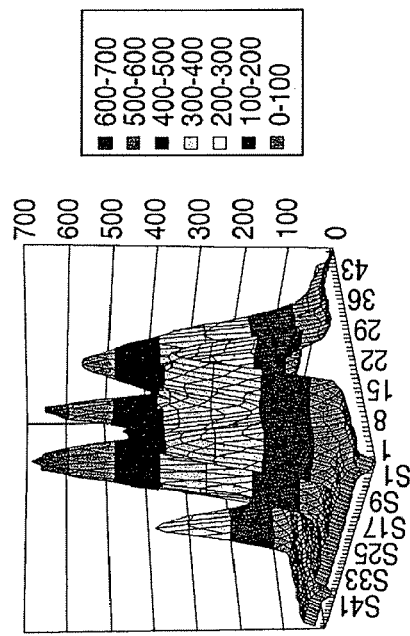
FIG. 3D shows the 3D graph viewed from above.
Figure 3A:
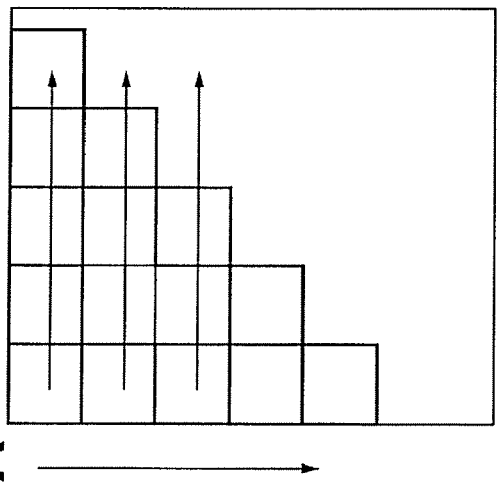
FIG. 3A is a view for explaining processing for extracting rectangular images.

Next, an extraction unit 206 executes processing for extracting rectangular images having a predetermined size in turn from the binary image received from the binarization unit 205, as shown in FIG. 3A. Note that the predetermined size is z×z in both the vertical and horizontal directions. Note that z is a numerical value used as the distance between the central points of neighboring bit expression patterns upon generating the image to be processed. Assume that the extraction unit 206 knows this numerical value in advance. That is, the extraction unit 206 executes processing for dividing the binary image into rectangles having the predetermined size. One divided rectangle corresponds to a rectangular image.

Figure 3C:
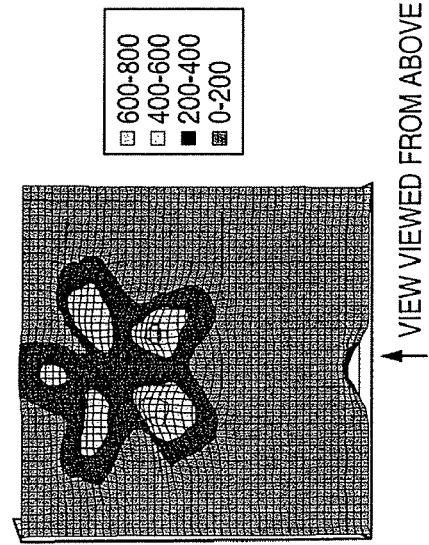
FIG. 3C shows a three-dimensional (3D) graph showing the accumulated values of pixel values of pixels obtained by calculating projections of the piled patterns in the vertical direction.

A piled pattern generator 207 generates piled patterns which hold accumulated values of pixel values at identical pixel positions upon piling up the rectangular images extracted by the extraction unit 206, as shown in FIG. 3B. FIG. 3C is a 3D graph showing the accumulated values of pixel values of pixels obtained by calculating projections of the piled patterns in the vertical direction. FIG. 3D shows this 3D graph viewed from above.

A matched filter unit 208 generates an alignment pattern by compositing the three bit expression patterns shown in FIGS. 4A to 4C (in the following description, as an example of composition, these three bit expression patterns undergo logical sum composition; for example, logical sum composition of a black pattern and white pattern results in a black pattern). For example, upon calculating a logical sum of the bit expression patterns shown in FIGS. 4A to 4C, a pattern (alignment pattern) shown in FIG. 5B can be obtained. The matched filter unit 208 applies matched filter processing between this alignment pattern and the piled patterns obtained from the piled pattern generator 207. For example, when the piled pattern is as shown in FIG. 5A (the accumulation values of pixel values of respective pixels) and the alignment pattern is as shown in FIG. 5B, the result of this matched filter processing is as shown in FIG. 5C.

A peak detector 209 detects a position (peak position) with the largest value with reference to the matched filter processing result (FIG. 5C). This peak position matches the alignment pattern on the piled patterns best.

An extraction unit 210 executes processing for dividing the binary image received from the binarization unit 205 into rectangular images having the predetermined size again as in the extraction unit 206. Note that the extraction unit 210 adjusts the extraction position so that the peak position detected by the peak detector 209 is located at the center of each rectangular image, and then executes the processing for dividing the binary image rectangular images having the predetermined size. As a result, the extraction unit 210 can obtain rectangular image so that one bit expression pattern appears per rectangular image.

A pattern recognition unit 211 applies pattern recognition processing to the respective rectangles divided by the extraction unit 210 to execute processing for specifying a bit expression pattern (one of FIGS. 4A to 4C) in each rectangle. Various kinds of pattern recognition processing are available, and any of these methods may be used. For example, the pattern recognition unit 211 uses a pattern recognition method based on the residual sum of squares (nearest neighbor method). The pattern recognition unit 211 obtains the recognition result as a bit expression pattern sequence.

Therefore, the pattern recognition unit 211 outputs the recognition result of the bit expression pattern which forms one tile to a decoder 212. Of course, the pattern recognition unit 211 may output bit expression patterns for a plurality of tiles to the decoder 212 for different purposes.

The decoder 212 specifies embedding information corresponding to the bit expression pattern recognized by the pattern recognition unit 211. This processing can be attained when the extracting device also refers to a table used in the embedding device. In this way, the decoder 212 can reconstruct embedding information corresponding to the bit expression pattern which forms one tile. Note that the decoding result may be displayed on a predetermined display device or may be held by the extracting device side.

Figure 7:
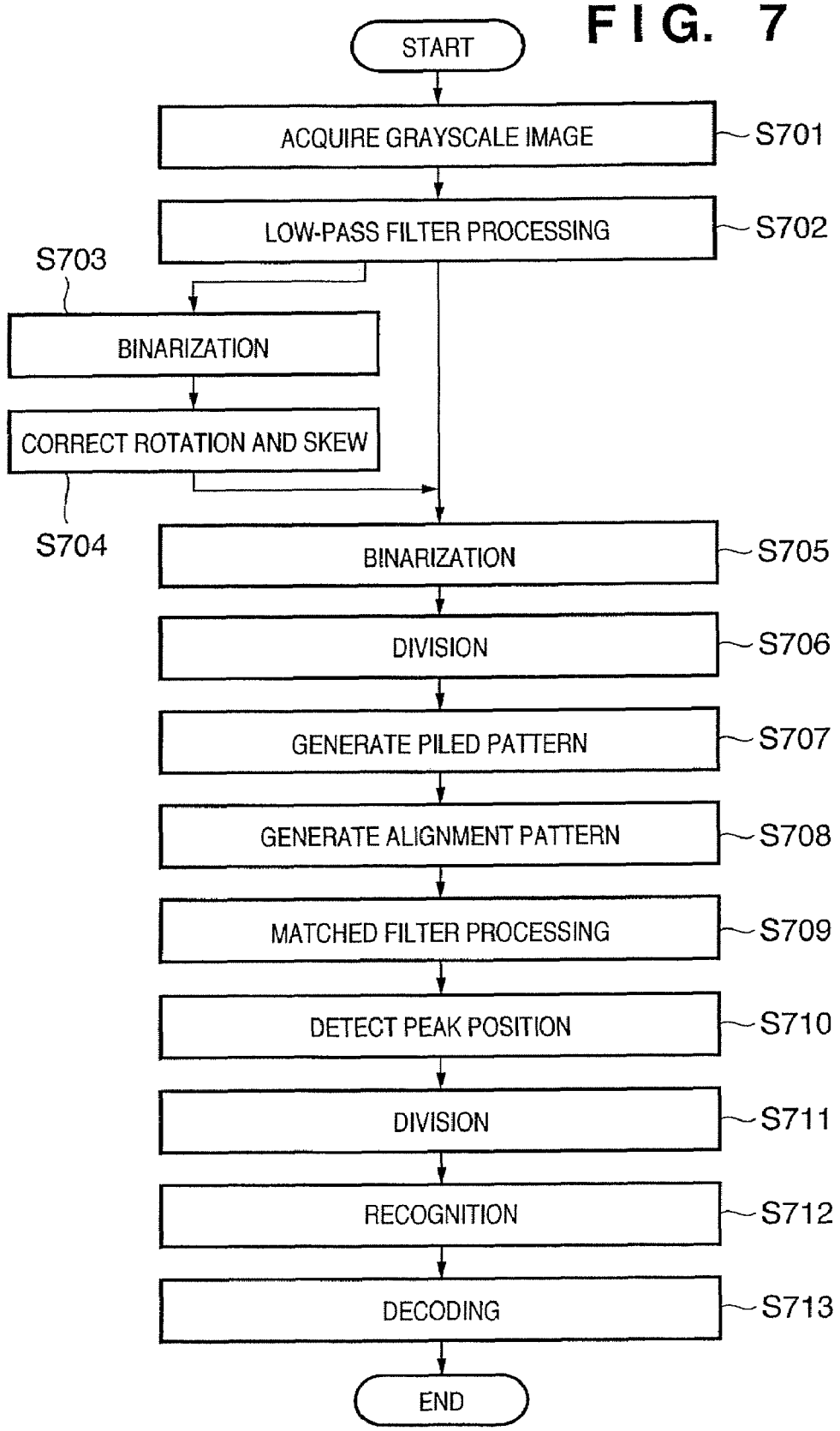
FIG. 7 is a flowchart showing the processing to be executed by the extracting device.
Figure 8:
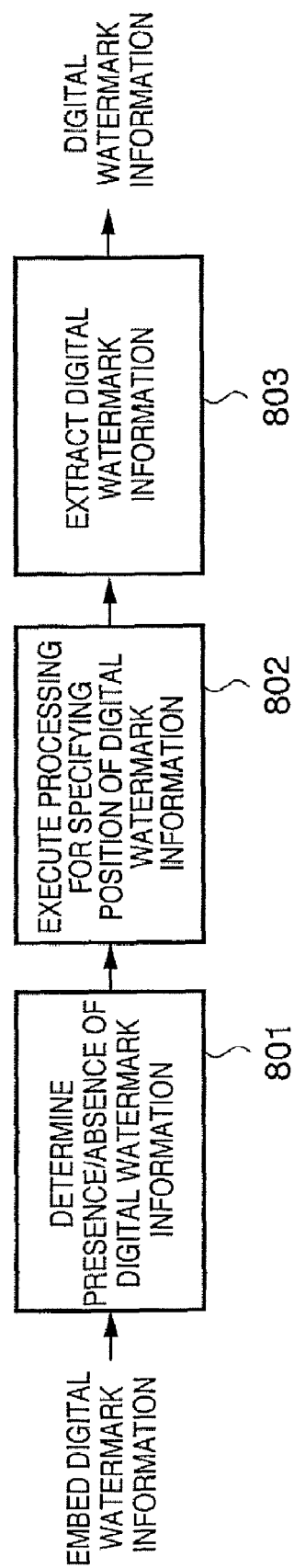
FIG. 8 is a flowchart showing the processing in the conventional digital watermark extraction technique.

FIG. 7 is a flowchart showing the processing to be executed by the aforementioned extracting device. Since the processing according to the flowchart shown in FIG. 7 is as has been described above, a brief explanation will be given.

In step S701, the acquisition unit 201 acquires the grayscale image. In step S702, the filter unit 202 applies the low-pass filter processing using a low-pass filter to this grayscale image. In step S703, the binarization unit 203 applies the binarization processing to the input grayscale image to correct any skew and rotation upon inputting a print to the scanner. In step S704, the rotation correction unit 204 executes processing for detecting a skew and rotation of a document from a text part on the binary image, and correcting the skew and direction of the grayscale image to be input to the binarization unit 205.

On the other hand, in step S705 the binarization unit 205 applies the binarization processing to the input grayscale image (which has undergone correction of the skew and direction by the rotation correction unit 204) to emphasize the camouflage patterns.

In step S706, the extraction unit 206 executes processing for extracting rectangular images having the predetermined size in turn from the binary image received from the binarization unit 205. In step S707, the piled pattern generator 207 generates the piled patterns by piling up the extracted rectangular images.

In step S708, the matched filter unit 208 generates an alignment pattern by making the logical sum composition of bit expression patterns. In step S709, the matched filter unit 208 executes the matched filter processing between this alignment pattern and the piled patterns obtained from the piled pattern generator 207.

In step S710, the peak detector 209 detects the peak position with reference to the matched filter processing result. In step S711, the extraction unit 210 executes the processing for dividing the binary image received from the binarization unit 205 into rectangular images having the predetermined size based on the detected peak position. However, as described above, the extraction unit 210 moves the position of the predetermined region set by the extraction unit 206 based on the peak position in the piled patterns.

In step S712, the pattern recognition unit 211 applies the pattern recognition processing to the rectangular images received from the extraction unit 210 to execute processing for specifying a bit expression pattern (one of FIGS. 4A to 4C) in each rectangle. Finally, in step S713 the decoder 212 specifies embedding information corresponding to the bit expression pattern which forms one tile. In this way, the decoder 212 can reconstruct embedding information corresponding to the bit expression pattern which forms one tile.

Figure 6:
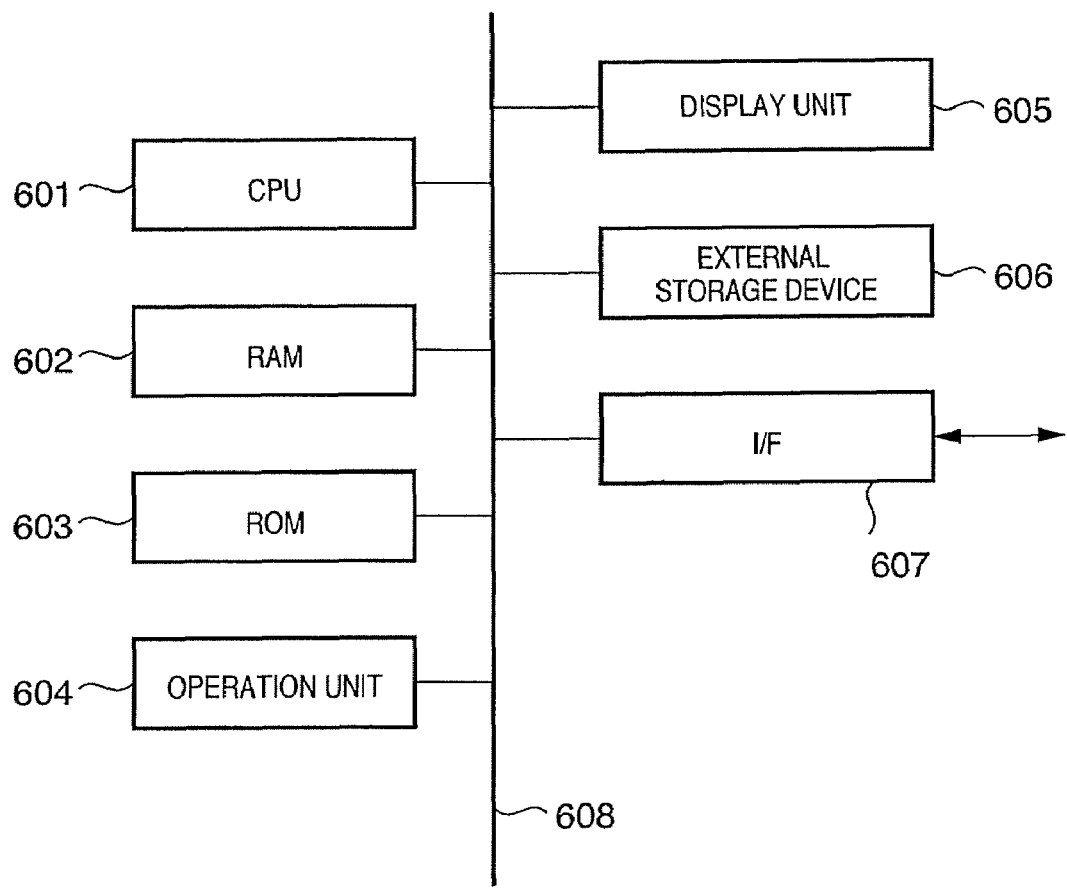
FIG. 6 is a block diagram showing the hardware arrangement of a computer which can be applied to the embedding device and extracting device.

FIG. 6 is a block diagram showing the hardware arrangement of a computer which can be applied to the embedding device and extracting device. Note that the embedding device and extracting device may be implemented by different computers or by a single computer.

Reference numeral 601 denotes a CPU which controls the overall computer using programs and data stored in a RAM 602 and ROM 603, and executes the respective processes to be implemented by the embedding device and extracting device to which this computer is applied.

Reference numeral 602 denotes a RAM which comprises an area for temporarily storing programs and data loaded from an external storage device 606 and those externally received via an I/F (interface) 607. Also, the RAM 602 has a work area or the like used by the CPU 601 upon execution of the respective processes.

Reference numeral 603 denotes a ROM which stores setting data, a boot program, and the like of this computer.

Reference numeral 604 denotes an operation unit which comprises a keyboard, mouse, and the like. When the operator of this computer operates the operation unit 604, the operation unit 604 can input various instructions.

Reference numeral 605 denotes a display unit which comprises a CRT, liquid crystal display, or the like, and can display the processing result of the CPU 601 by means of images, text, and the like.

Reference numeral 606 denotes an external storage device which is a large-capacity information storage device represented by a hard disk. The external storage device 606 saves an OS (operating system), programs and data for making the CPU 601 execute the respective processes (including the processing according to the flowchart shown in FIG. 7) to be implemented by the respective units shown in FIGS. 1 and 2, and the like. These programs and data are loaded onto the RAM 602 under the control of the CPU 601, and are to be processed by the CPU 601.

The external storage device 606 saves data required for the respective processes. For example, the external storage device 606 saves data of the document image, copy-forgery-inhibited pattern, bit expression patterns, table, and the like. Note that the display unit 605 may display copy-forgery-inhibited patterns and document images, and the operator may select the pattern and image to be used using the operation unit 604 as needed.

Reference numeral 607 denotes an I/F. For example, a scanner may be connected to the I/F 607, and the RAM 602 and external storage device 606 may acquire image data of a document scanned by this scanner.

Reference numeral 608 denotes a bus which interconnects the aforementioned units.

As described above, according to this embodiment, the boundaries of the plurality of types of patterns which are juxtaposed in a tile manner can be quickly and accurately detected.

Second Embodiment

Figure 9:
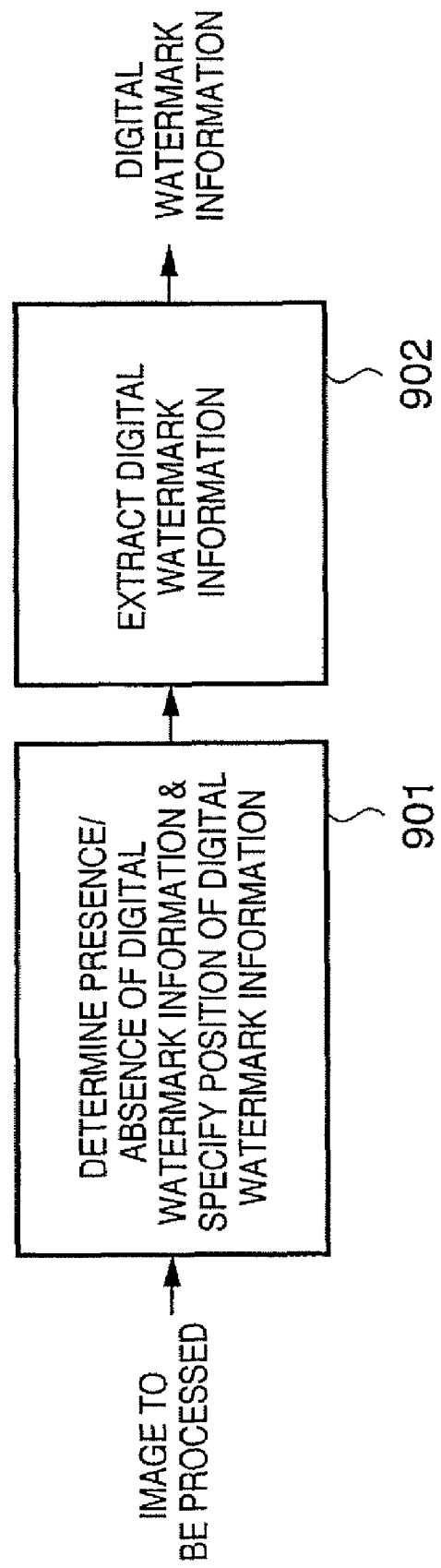
FIG. 9 is a chart for explaining extraction processing according to the second embodiment of the present invention.

This embodiment extracts bit expression patterns as embedding information by a method different from the first embodiment. Roughly speaking, this embodiment executes extraction processing in the procedure of processes shown in FIG. 9. That is, processing for determining the presence/absence of embedding information (digital watermark information), and specifying the embedded position is executed in step 901, and processing for extracting the embedding information is executed in step 902.

A target image from which bit expression patterns are to be extracted in this embodiment uses the image to be processed described in the first embodiment.

Figure 10:
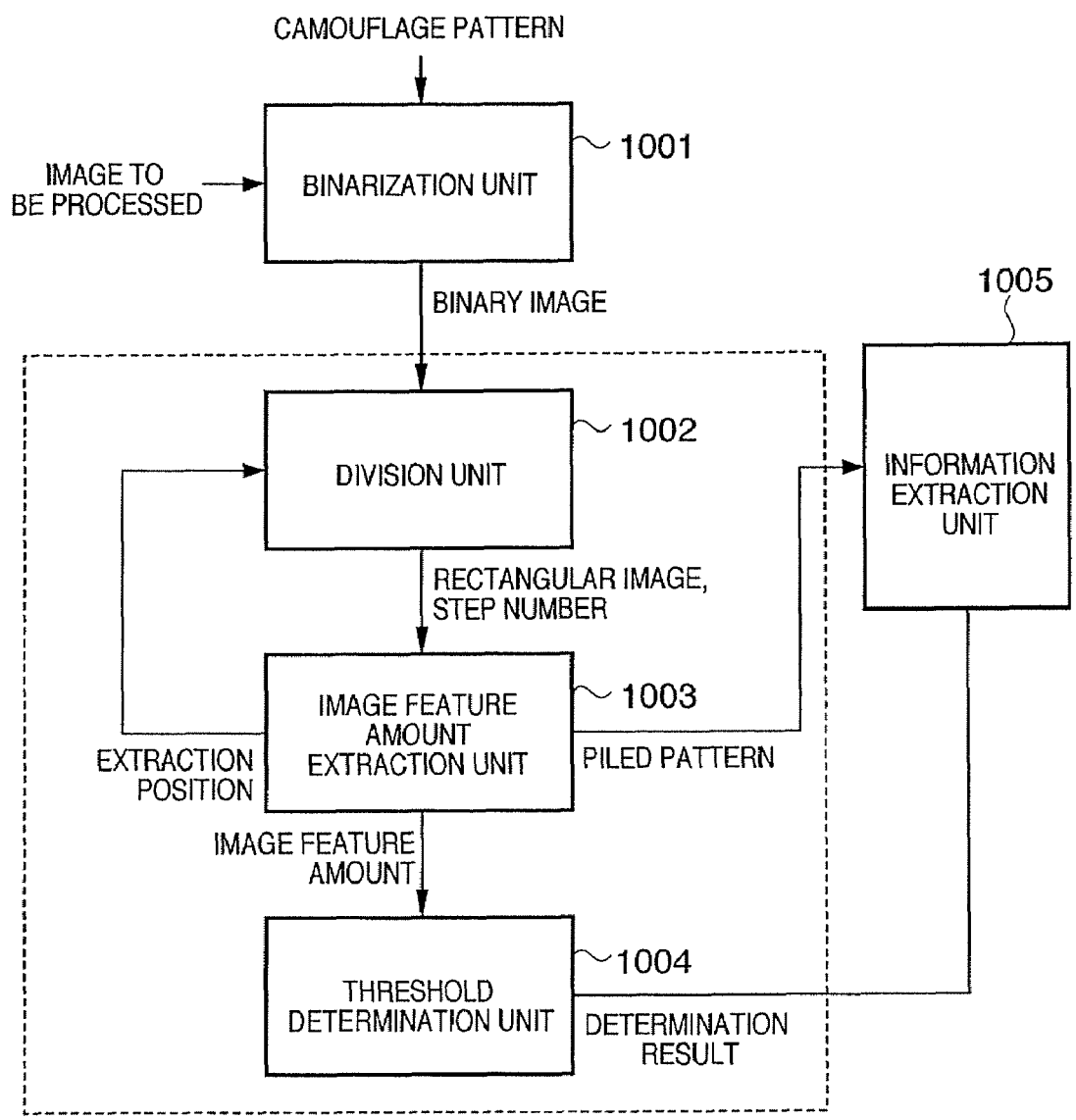
FIG. 10 is a block diagram showing the functional arrangement of an extracting device for extracting a bit expression pattern from an image to be processed.

FIG. 10 is a block diagram showing the functional arrangement of an extracting device for extracting bit expression patterns from the image to be processed.

A binarization unit 1001 receives the image to be processed as a grayscale image as in the first embodiment. The binarization unit 1001 applies binarization processing to the input grayscale image (which has undergone correction of the skew and direction by the rotation correction unit 204). More specifically, the binarization unit 1001 applies the binarization processing to emphasize the camouflage patterns. This embodiment uses tile-shaped bit expression patterns shown in FIGS. 19A to 19C.

Figure 20:
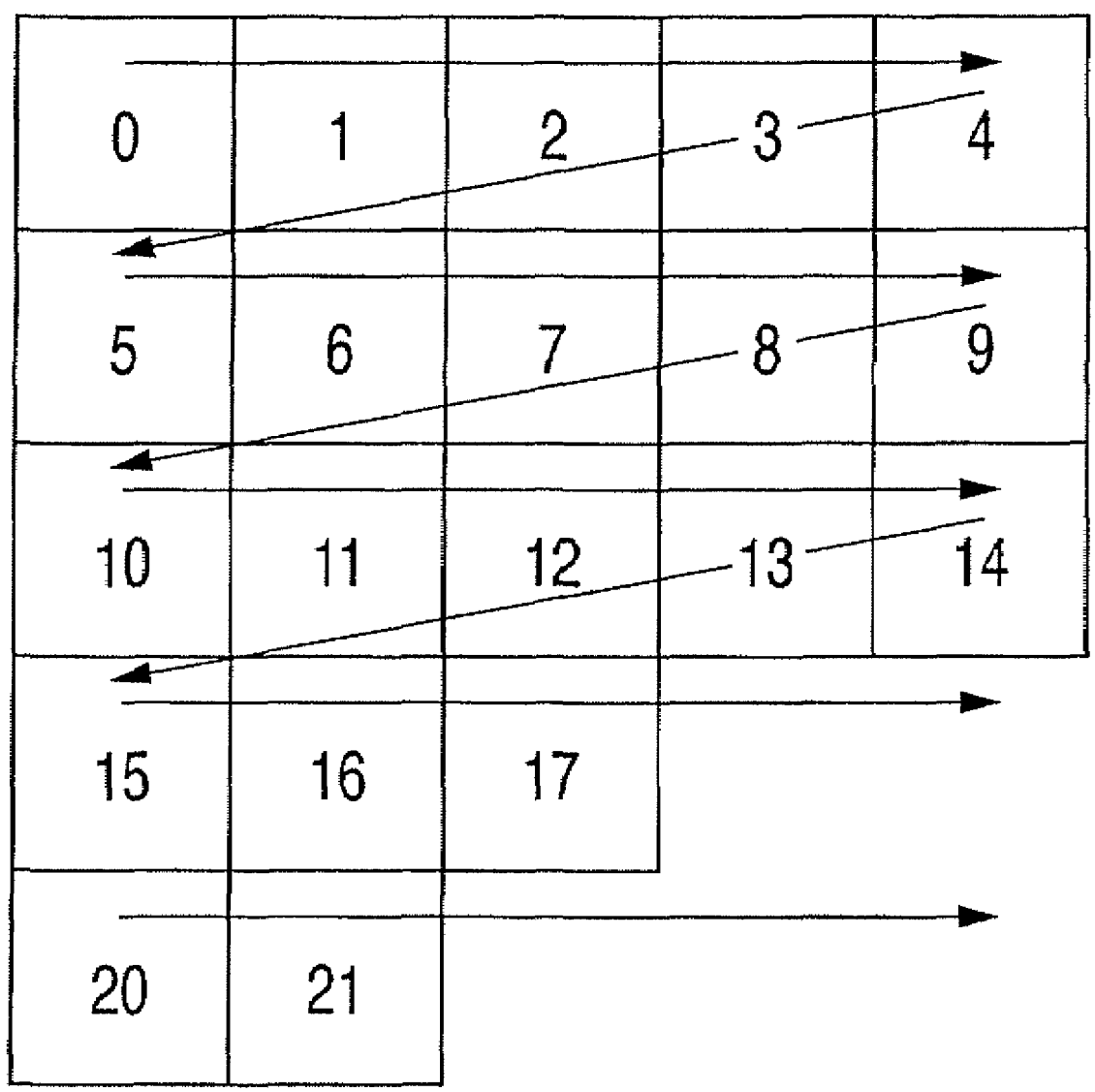
FIG. 20 is a view for explaining the division processing by the division unit 1002.

Next, a division unit 1002 executes processing for extracting rectangular images having a predetermined size in turn from an extraction position in the binary image received from the binarization unit 1001 in a predetermined direction, as shown in FIG. 20. Note that the predetermined size is z×z in both the vertical and horizontal directions. Note that z is a numerical value used as the distance between the central points of neighboring bit expression patterns upon generating the image to be processed. Assume that the division unit 1002 knows this numerical value in advance. That is, the division unit 1002 executes processing for dividing the binary image into rectangles having the predetermined size. One divided rectangle corresponds to a rectangular image. The division unit 1002 outputs the rectangular images and the numbers of the respective rectangles (step numbers) to an image feature amount extraction unit 1003.

Figure 22:
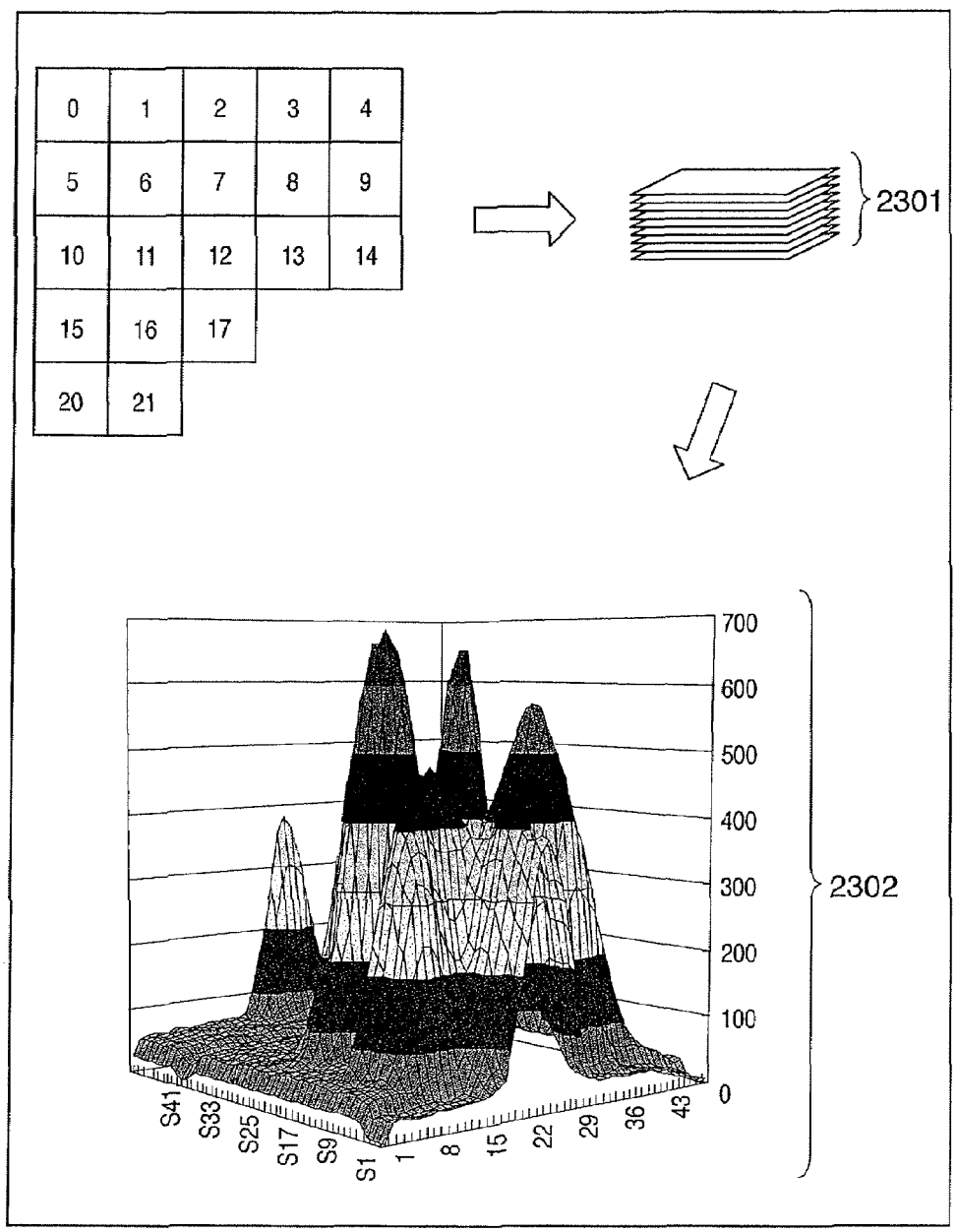
FIG. 22 is a view for explaining the generation processing of piled patterns.

The image feature amount extraction unit 1003 generates piled patterns 2301 which hold accumulated values of pixel values at identical pixel positions upon piling up the rectangular images extracted by the division unit 1002, as shown in FIG. 22. Reference numeral 2302 denotes a 3D graph showing the accumulated values of pixel values of pixels obtained by calculating projections of the piled patterns in the vertical direction.

Figure 19C:
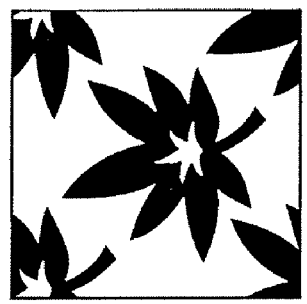
FIGS. 19A to 19C show bit expression patterns.
Figure 19B:
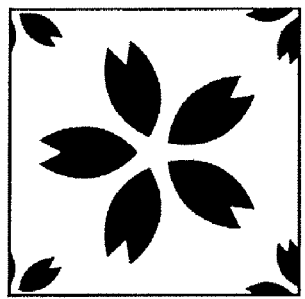
Figure 19A:
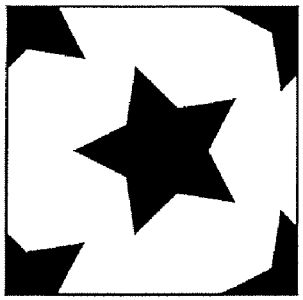

The image feature amount extraction unit 1003 generates an alignment pattern by calculating the logical sum of the three bit expression patterns shown in FIGS. 19A to 19C. For example, upon calculating the logical sum of the bit expression patterns shown in FIGS. 19A to 19C, a pattern (alignment pattern) shown in FIG. 21 can be obtained.

The image feature amount extraction unit 1003 calculates the extraction position and an image feature amount (to be described later) using the piled patterns and alignment pattern. The image feature amount extraction unit 1003 outputs the extraction position to the division unit 1002, which executes processing for extracting rectangular images for respective rectangles having the predetermined size in a predetermined direction from the new extraction position again.

A threshold determination unit 1004 checks using the image feature amount received from the image feature amount extraction unit 1003 if the bit expression patterns are originally embedded in the image to be processed. If the bit expression patterns are embedded, an information extraction unit 1005 executes processing for receiving the piled patterns generated by the image feature amount extraction unit 1003, and extracting the bit expression patterns from the piled patterns.

The respective units shown in FIG. 10 will be described in more detailed below.

Figure 15:
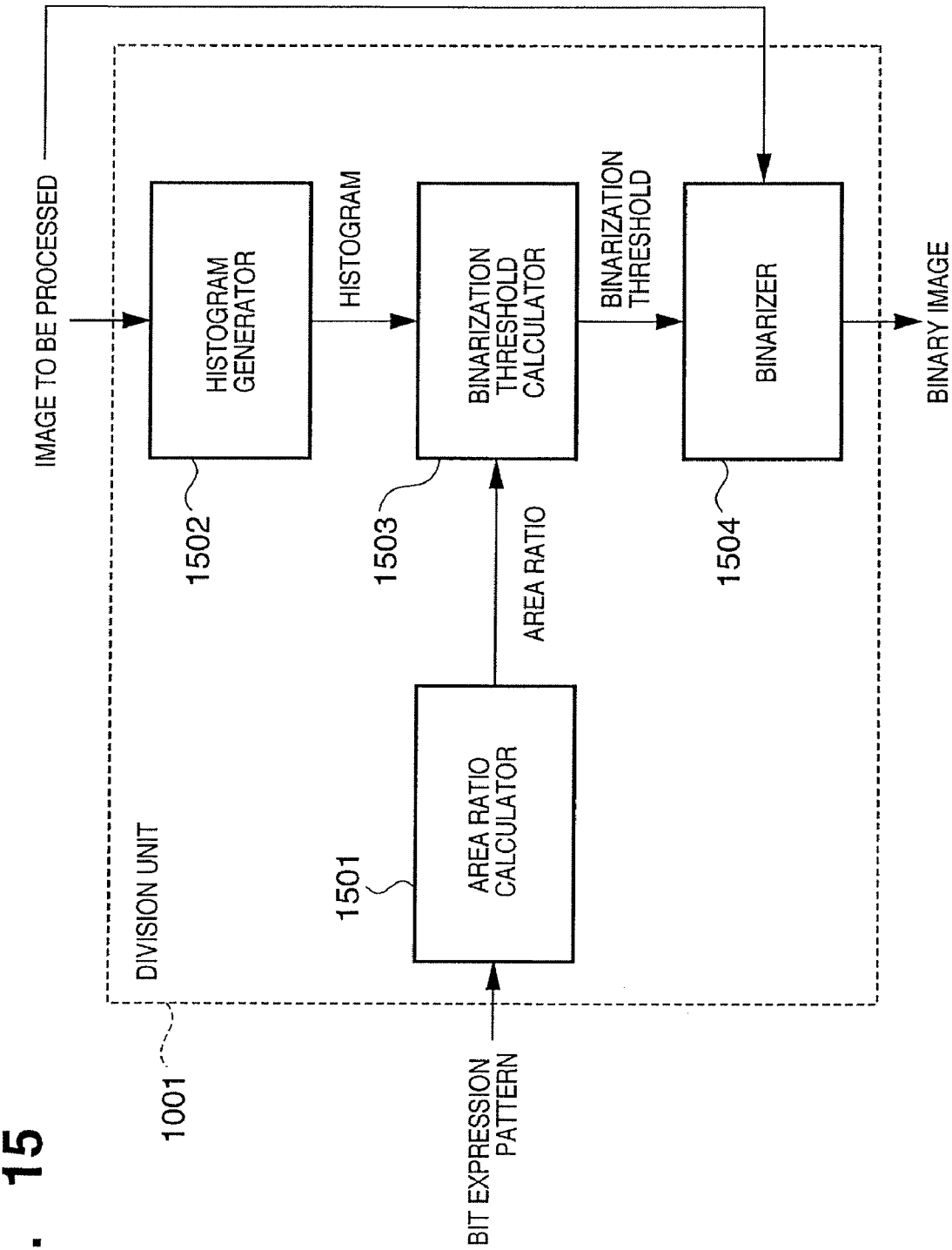
FIG. 15 is a block diagram showing the functional arrangement of a binarization unit 1001.

FIG. 15 is a block diagram showing the functional arrangement of the binarization unit 1001. The binarization unit 1001 applies the binarization processing to the grayscale image as the image to be processed to emphasize camouflage patterns. For this purpose, the binarization unit 1001 executes binarization, a calculation of a binarization threshold for binarization, generation of a histogram required to calculate the binarization threshold, and a calculation of an area ratio of a pattern part.

There are two reasons for making such calculation of the binarization threshold:

a blank part formed by camouflage has the lightness value of a paper sheet, and is brightest in the document; and even when the blank part lacks due to text or the like, the area ratio of the blank part of is nearly equal to that of the pattern part in the document as a whole.

Respective units which form the binarization unit 1001 shown in FIG. 15 will be described below.

An area ratio calculator 1501 selects one of all the bit expression patterns embedded in the image to be processed, and calculates an occupation ratio of the pattern part of the selected bit expression pattern to the bit expression pattern as an area ratio D. The calculator 1501 outputs the calculated area ratio D to a binarization threshold calculator 1503.

A histogram generator 1502 generates a histogram of the luminance values of the grayscale image. The binarization threshold calculator 1503 calculates a luminance value obtained when "an occupation ratio of an integrated value r to an integrated value R obtained by integrating all luminance values in a luminance direction" is closest to D in the process of integrating the histogram in turn in descending order of luminance value.

A binarizer 1504 sets pixel values in the grayscale image equal to or higher than this threshold to be 255 and those less than the threshold to be 0. Of course, the binarization processing to be applied to emphasize the camouflage patterns is not limited to such specific processing. Alternatively, the processing according to the first embodiment may be used, or various other kinds of processing may be used.

Figure 11:
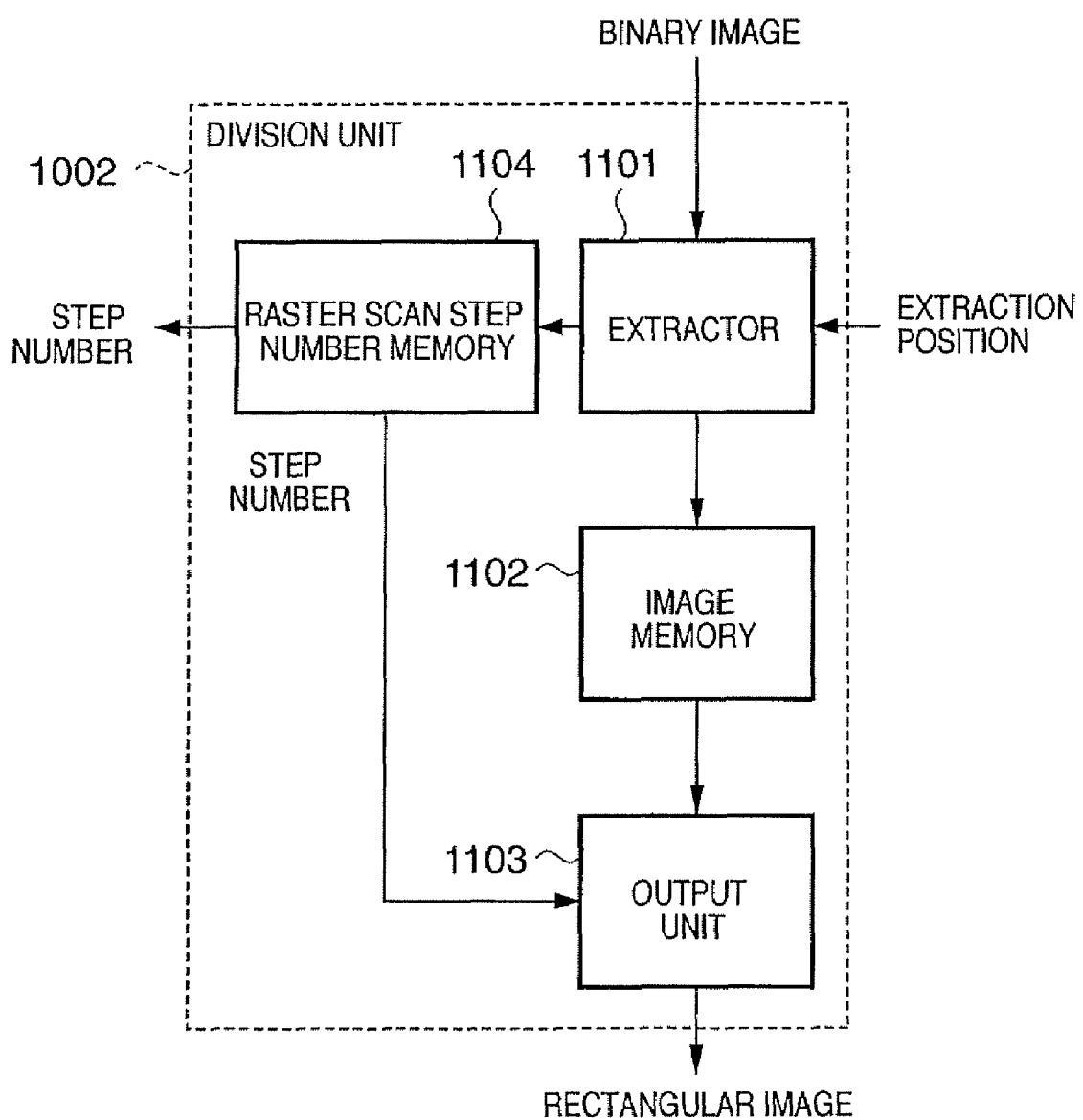
FIG. 11 is a block diagram showing the functional arrangement of a division unit 1002.

FIG. 11 is a block diagram showing the functional arrangement of the division unit 1002. An extractor 1101 executes the processing for extracting rectangular images for respective rectangles having the predetermined size from an appropriate extraction position in the binary image received from the binarization unit 1001 in a predetermined direction (e.g., a raster scan direction), as shown in FIG. 20. Assume that the "appropriate extraction position" is, e.g., the position of an upper left corner first. When this extraction position is calculated in the subsequent processing, the extractor 1101 uses this calculated extraction position.

Every time the extractor 1101 extracts one rectangular image, it stores a step number corresponding to the extracted rectangular image in a raster scan step number memory 1104.

An image memory 1102 temporarily stores respective rectangular images obtained from the extractor 1101. An output unit 1103 reads out a rectangular image from the image memory 1102 in ascending order of step number (or descending order of step number; the present invention is not particularly limited in this regard) with reference to the raster scan step number memory 1104, and outputs the readout image to the image feature amount extraction unit 1003.

If respective rectangular images are considered as elements of a matrix, and each rectangular image is designated by a row number and column number, the row number is determined by (the step number)/(the number of columns), and the column number is determined by (the step number) % (the number of columns) (x % y is the remainder of x/y). Therefore, which of rectangular images is to be read out from the image memory 1102 can be uniquely determined by the step number. Also, the number of columns is determined by the quotient of (the width of the binary image)/(the width of the bit expression pattern).

Figure 12:
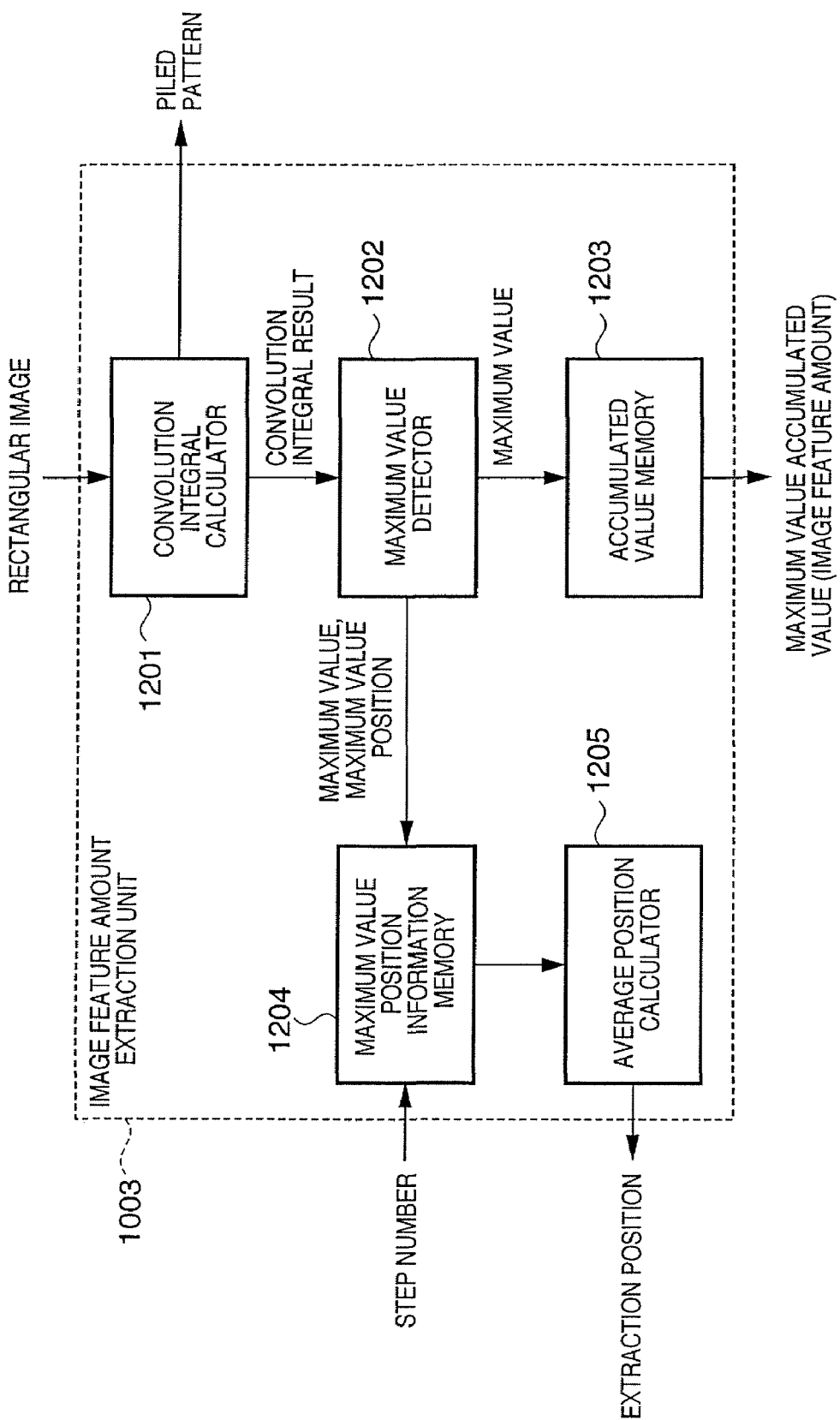
FIG. 12 is a block diagram showing the functional arrangement of an image feature amount extraction unit 1003.

FIG. 12 is a block diagram showing the functional arrangement of the image feature amount extraction unit 1003.

Upon reception of the rectangular images, a convolution integral calculator 1201 generates the piled patterns first by piling up the received rectangular images, as shown in FIG. 22. The calculator 1201 outputs the generated piled patterns to the information extraction unit 1005. The convolution integral calculator 1201 generates an alignment pattern by calculating the logical sum of all the bit expression patterns used (those which are shown in FIGS. 19A to 19C).

The convolution integral calculator 1201 makes convolution integral calculations between the respective rectangular images and the alignment pattern. Note that the convolution integral (convolution) is the following mathematical calculation processing. If two functions g(t) and f(t) are given, the convolution integral calculation of these two functions is executed according to the following formula:

$$g(t) * f(t) = \int_{-\infty}^{\infty} g(t) \cdot f(\tau - t) dt$$

If two functions g(x,y) and f(x,y) are given, the convolution integral calculation of these two functions is executed according to the following formula:

$$g(x, y) * f(x, y) = \int_{-\infty}^{\infty} \int_{-\infty}^{\infty} g(\alpha, \beta) \cdot f(x - \alpha, y - \beta) d\alpha d\beta$$

The convolution integral calculator 1201 makes the convolution integral calculations between the rectangular images output from the output unit 1103 and the alignment pattern based on such formula. By making the convolution integral calculation between each rectangular image and the alignment pattern, the calculator 1201 obtains a matrix having the same size as the rectangular image. The calculator 1201 outputs the obtained matrix to a maximum value detector 1202. In this way, every time the convolution integral calculator 1201 obtains a rectangular image from the output unit 1103, it makes the convolution integral calculation between this rectangular image and the alignment pattern, and outputs a matrix obtained as a result of the calculation to the maximum value detector 1202. That is, the convolution integral calculator 1201 calculates matrices as many as the number of rectangular images.

Upon reception of a matrix from the convolution integral calculator 1201, the maximum value detector 1202 specifies an element (maximum value element) having a maximum value of those which form the received matrix, and stores the value (maximum value) of the maximum value element and its position (the position of the maximum value element in the matrix) in a maximum value position information memory 1204. As described above, since the convolution integral calculator 1201 obtains matrices as many as the number of rectangular images by making the convolution integral calculations between the respective rectangular images and the alignment pattern, and outputs the matrices to the maximum value detector 1202, the maximum value detector 1202 obtains the maximum values in matrices and the positions of the maximum value elements as many as the number of matrices, and stores them in the maximum value position information memory 1204.

An average position calculator 1205 makes the following calculation using all the maximum values and all the positions of the maximum value elements stored in the maximum value position information memory 1204:

$$P=(S(1) \times M(1)+S(2) \times M(2)+ \ldots S(N) \times M(N))/(S \times N)$$

where $S(x)$ ($x=1, 2, \ldots, N$) is the maximum value in the matrix obtained as a result of the convolution integral calculation between a rectangular image at the step number=X and the alignment pattern, S is the sum total of all the maximum values, and $M(x)$ is the position of the maximum vale element in the matrix obtained as a result of the convolution integral calculation between a rectangular image at the step number=X and the alignment pattern. Also, N is the number of rectangular images.

P obtained by such calculation indicates an average position of the positions of the maximum value elements in the respective matrices. Note that various formulas for calculating P are available, and the present invention is not limited to such specific calculation method.

The difference between the position P calculated in this way and the position of the upper left corner of the rectangular image corresponds to that between the current extraction position and a position which should be originally set as the extraction position. That is, P is the position which should be originally set as the extraction position. Therefore, the average position calculator 1205 outputs calculated P as the extraction position to the division unit 1002. As a result, the division unit 1002 executes the processing for dividing the binary image into a plurality of rectangular images using this new extraction position again, as described above. The image feature amount extraction unit 1003 generates piled patterns obtained by piling up the respective divided rectangular images, and outputs them to the information extraction unit 1005.

On the other hand, when the maximum value detector 1202 specifies a maximum value in a given matrix, it adds the specified maximum value to the value already stored in an accumulated value memory 1203, and stores the sum in the accumulated value memory 1203. In this way, the accumulated value memory 1203 holds the accumulated value of the already calculated maximum values. After the accumulated value of the maximum values for all the matrices is calculated, the accumulated value memory 1203 outputs it as an image feature amount to the threshold determination unit 1004.

Figure 13:
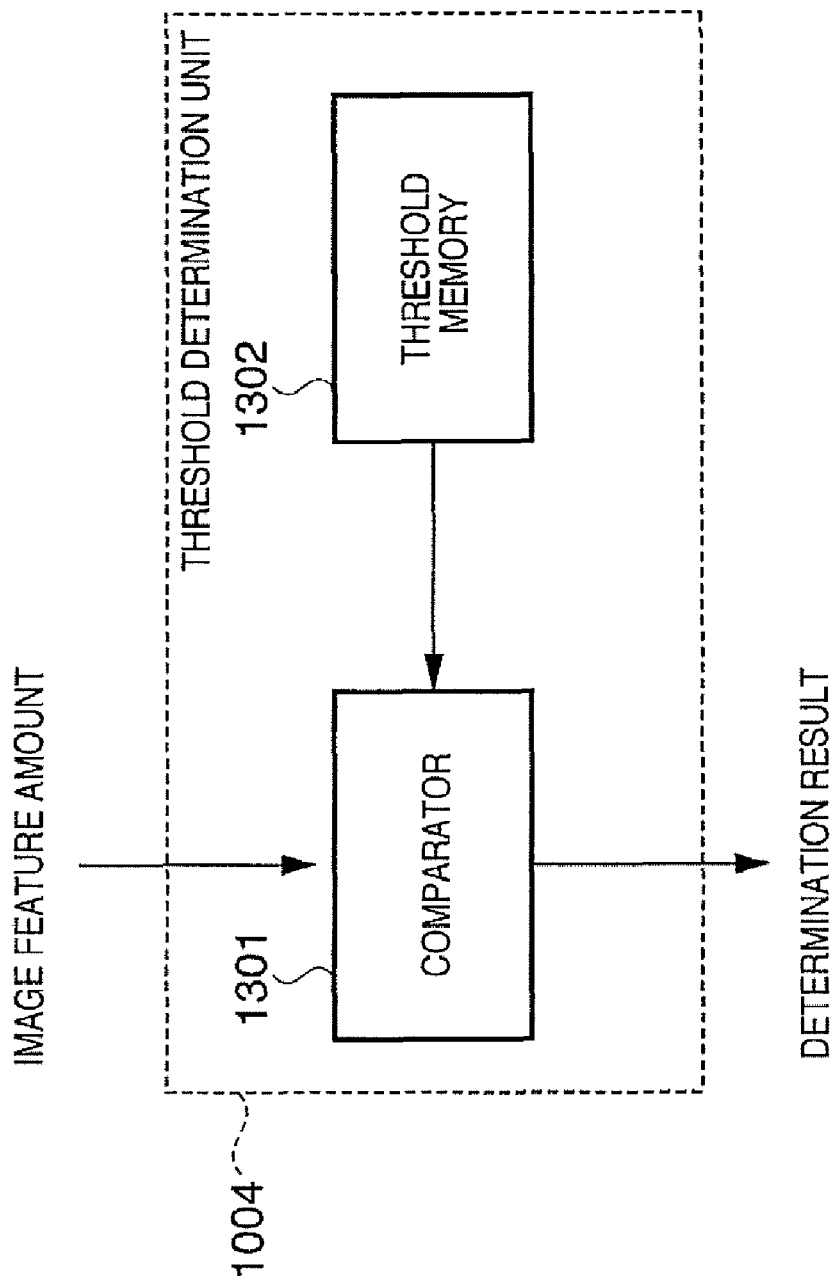
FIG. 13 is a block diagram showing the functional arrangement of a threshold determination unit 1004.

FIG. 13 is a block diagram showing the functional arrangement of the threshold determination unit 1004. Upon reception of the image feature amount, a comparator 1301 reads out a threshold stored and held in a threshold memory 1302, and compares the image feature amount with the readout threshold. If the image feature amount is larger than the threshold, the comparator 1301 determines that the bit expression patterns are embedded in the image to be processed. On the other hand, if the image feature amount is equal to or lower than the threshold, the comparator 1301 determines that no bit expression patterns are embedded in the image to be processed. The comparator 1301 outputs such determination result to the information extraction unit 1005.

Figure 16:
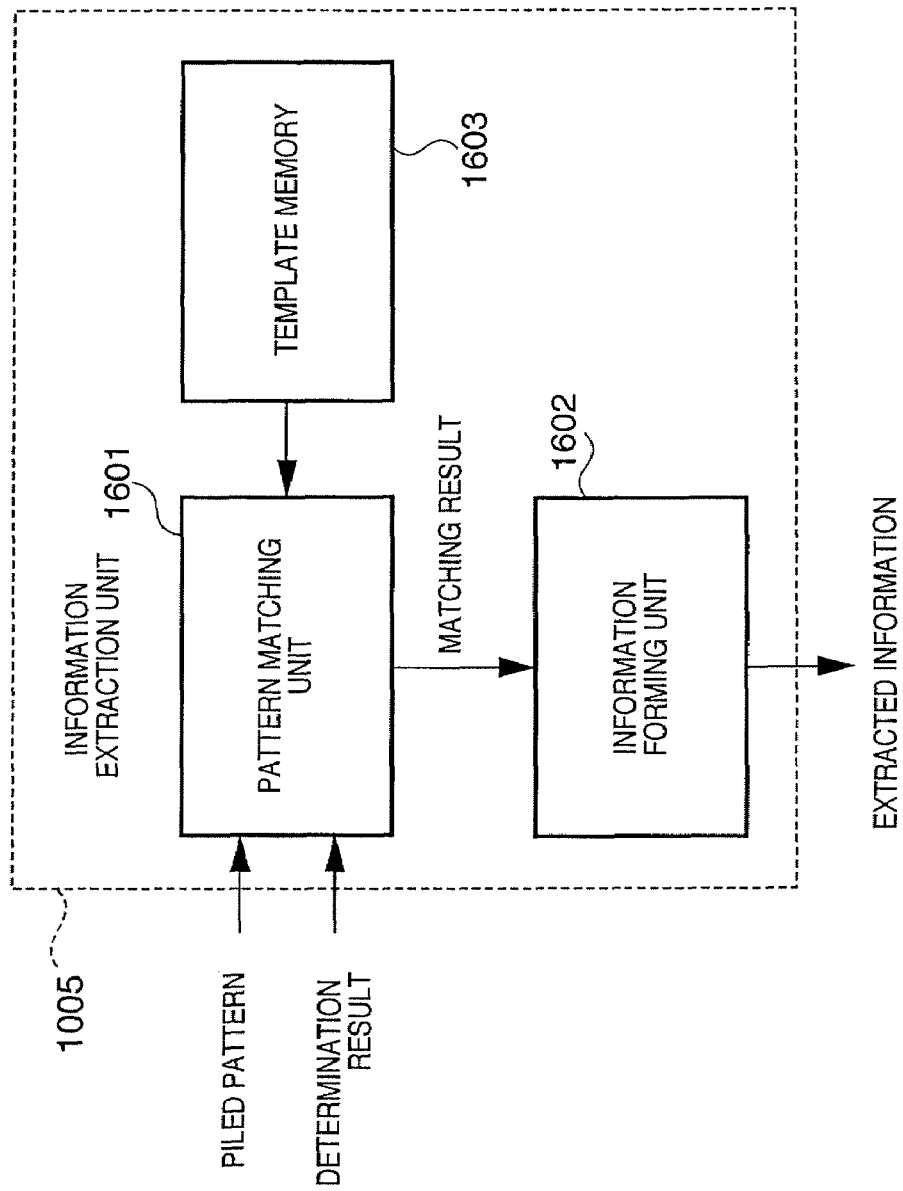
FIG. 16 is a block diagram showing the functional arrangement of an information extraction unit 1005.

FIG. 16 is a block diagram showing the functional arrangement of the information extraction unit 1005. When the determination result received from the threshold determination unit 1004 indicates that "the bit expression patterns are embedded in the image to be processed, a pattern matching unit 1601 performs pattern matching between each rectangular image which forms the piled patterns received from the image feature amount extraction unit 1003, and templates saved in a template memory 1603. The template memory 1603 saves various bit expression patterns as templates. Therefore, this template matching processing specifies a bit expression pattern corresponding to the pattern in each rectangular image. Note that any other kinds of processing may be used as long as the same object can be achieved. With this processing, the bit expression patterns are extracted from a plurality of consecutive rectangular images.

Therefore, the pattern matching unit 1601 outputs the recognition result of the bit expression pattern which forms one tile to an information forming unit 1602. Of course, the pattern matching unit 1601 may output bit expression patterns for a plurality of tiles for different purposes.

The information forming unit 1602 specifies embedding information corresponding to the bit expression pattern received from the pattern matching unit 1601. This processing can be attained when the extracting device also refers to the same table as that used in the embedding device. In this way, the information forming unit 1602 can reconstruct embedding information corresponding to the bit expression pattern which forms one tile. Note that the decoding result may be displayed on a predetermined display device or may be held by the extracting device side.

Figure 14:
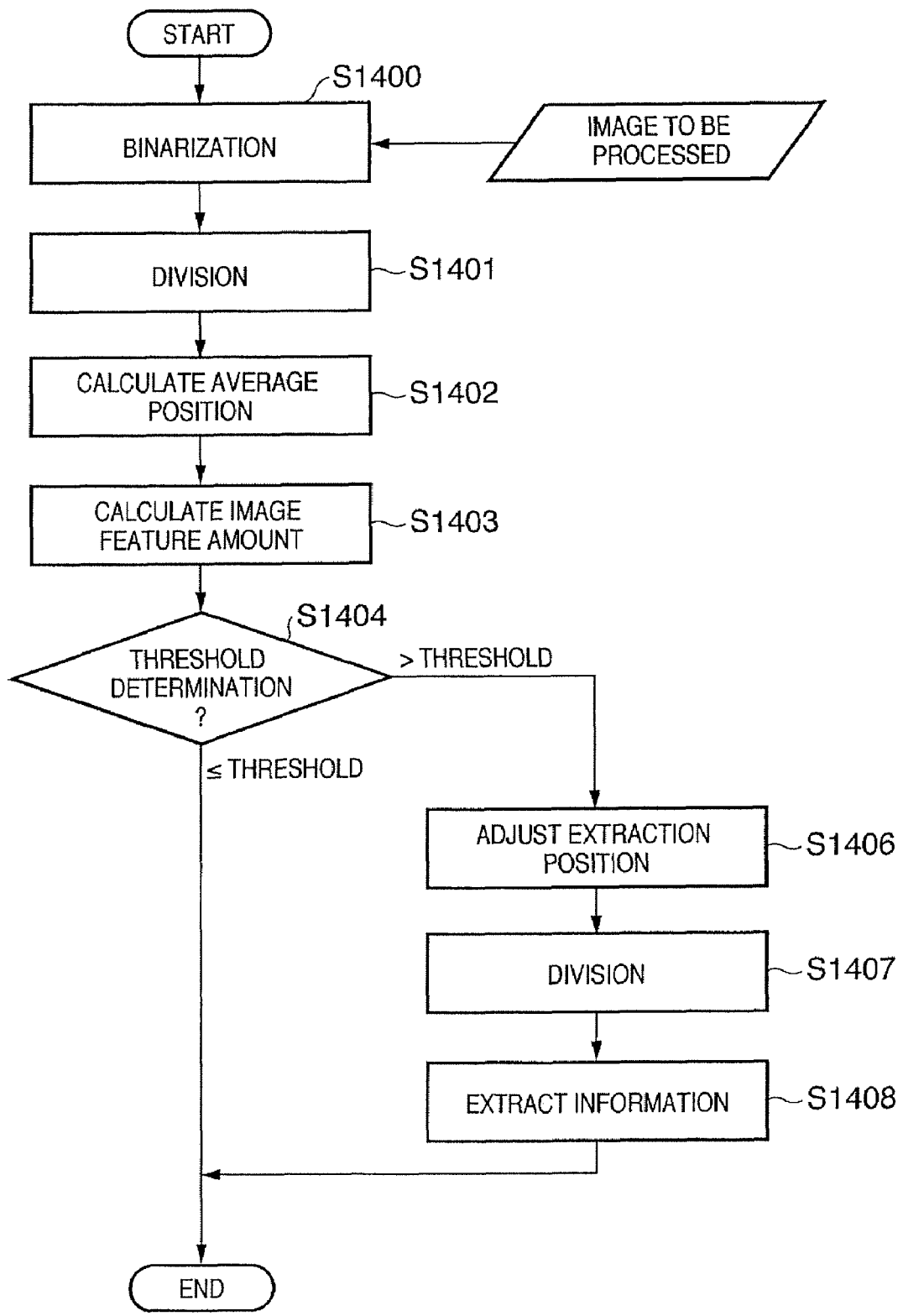
FIG. 14 is a flowchart of embedding information extraction processing.

FIG. 14 is a flowchart of the aforementioned embedding information extraction processing.

In step S1400, the binarization unit 1001 applies binarization processing to the image to be processed (grayscale image) emphasize the camouflage patterns. In step S1401, the division unit 1002 executes the processing for extracting rectangular images for respective rectangles having the predetermined size from the appropriate extraction position in this binary image in the predetermined direction (e.g., raster scan direction).

In step S1402, the image feature amount extraction unit 1003 generates piled patterns by piling up the received rectangular images. Furthermore, in step S1402 the image feature amount extraction unit 1003 calculates the average position of the positions of the maximum values in the matrices by making the aforementioned convolution integral calculations. In step S1403, the image feature amount extraction unit 1003 calculates the accumulated value of the maximum values for all the matrices as an image feature amount.

If the image feature amount is equal to or lower than the threshold, this processing ends via step S1404. On the other hand, if the feature amount is larger than the threshold, the process advances to step S1406 via step S1404. In step S1406, the image feature amount extraction unit 1003 sets the average position calculated in step S1402 as a new extraction position. In step S1407, the division unit 1002 executes processing for dividing the binary image into a plurality of rectangular images using the new extraction position again.

If the determination result received from the threshold determination unit 1004 indicates that "the bit expression patterns are embedded in the image to be processed", the information extraction unit 1005 specifies a bit expression pattern that forms one tile by performing pattern matching between each rectangular image that forms the piled patterns received from the image feature amount extraction unit 1003 and templates saved in the template memory 1603 in step S1408.

Needless to say, the computer having the arrangement shown in FIG. 6 can be applied to the extracting device according to this embodiment.

Third Embodiment

Figure 17:
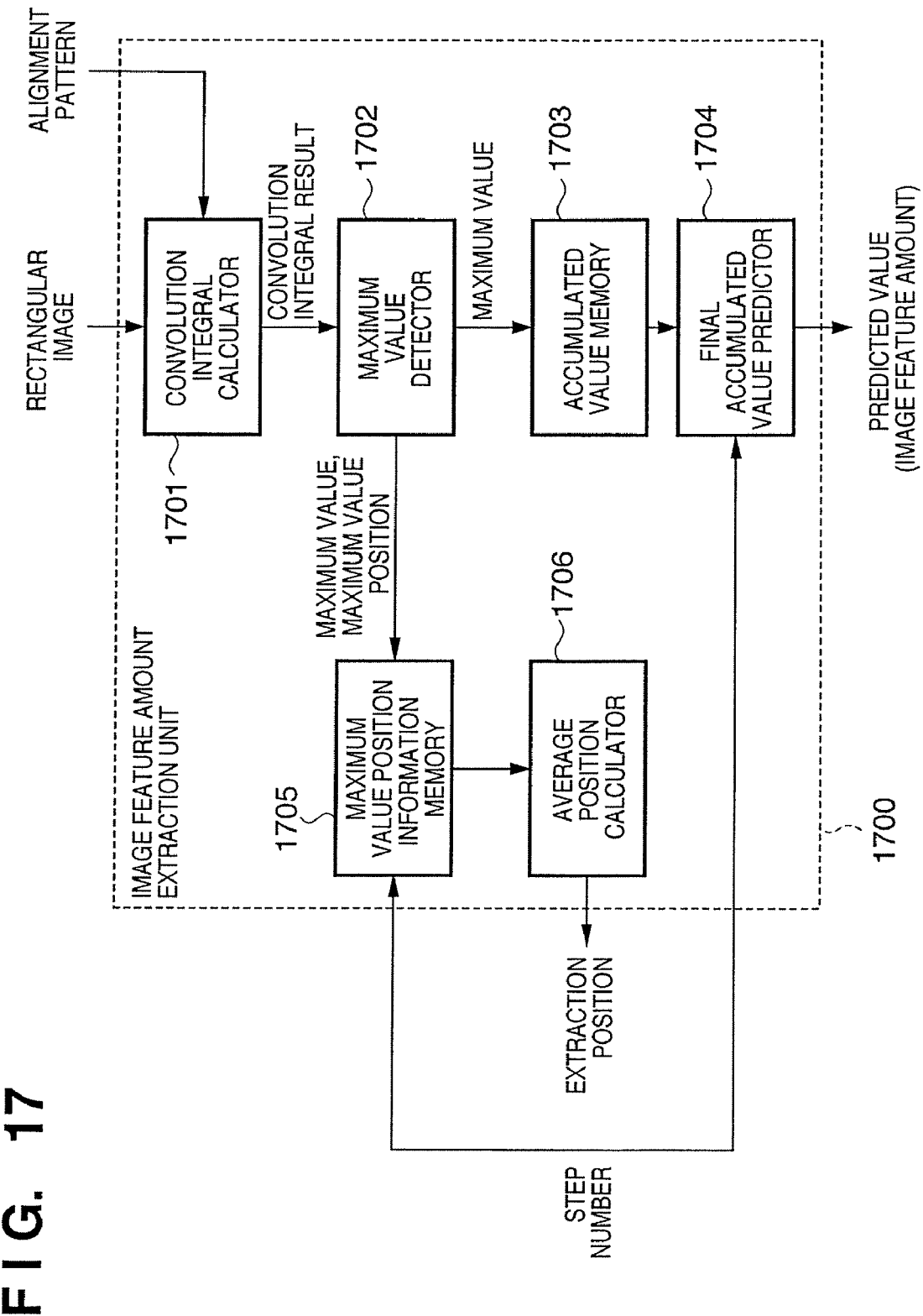
FIG. 17 is a block diagram showing the functional arrangement of an image feature amount extraction unit 1700 according to the third embodiment of the present invention.

This embodiment will explain an extracting device which speeds up the processing based on the arrangement according to the second embodiment. Only an image feature amount extraction unit of the extracting device according to this embodiment is different from the image feature amount extraction unit 1003 in the arrangement shown in FIG. 10. FIG. 17 is a block diagram showing the functional arrangement of an image feature amount extraction unit 1700 according to this embodiment. Only differences from the second embodiment will be explained below.

A convolution integral calculator 1701 generates matrices for respective rectangular images by making convolution integral calculations between the input rectangular images and the alignment pattern as in the convolution integral calculator 1201. A maximum value detector 1702 executes the same processing as in the maximum value detector 1202, and stores maximum values and the positions of maximum value elements in a maximum value position information memory 1705. An average position calculator 1706 executes the same processing as in the average position calculator 1205 to obtain a new extraction position, and outputs it to the division unit 1002.

On the other hand, an accumulated value memory 1703 executes the same processing as in the accumulated value memory 1203 to store the accumulated value of the maximum values, and outputs the currently held accumulated value to a final accumulated value predictor 1704.

The final accumulated value predictor 1704 executes processing for calculating a predicted value which the total value of maximum values is expected to reach upon calculating the maximum values for all the matrices based on the step number and the accumulated value currently held by the accumulated value memory 1703. Various kinds of such processing are available. For example, if the step number=S and the accumulated value T at the step number S, T is calculated for each of S=0 to 10. Assuming an equation T=A×S+B, this equation is settled by calculating parameters A and B using the method of least squares. The value of T upon substitution of S=S' (S' is the maximum step number) in the settled equation is calculated as the predicted value.

The predictor 1704 outputs the calculated predicted value to the threshold determination unit 1004. The threshold determination unit 1004 considers this predicted value as an image feature amount, and compares it with a threshold. If the image feature amount is equal to or larger than the threshold, the determination unit 1004 notifies the image feature amount extraction unit 1700 that the processing can be continued.

FIG. 18 is a flowchart of the processing to be executed by the extracting device according to this embodiment.

In step S1801, the binarization unit 1001 applies binarization processing to the image to be processed (grayscale image) emphasize the camouflage patterns. In step S1802, the division unit 1002 executes the processing for extracting rectangular images for respective rectangles having the predetermined size from the appropriate extraction position in this binary image in the predetermined direction (e.g., raster scan direction).

In step S1803, the image feature amount extraction unit 1700 generates piled patterns first by piling up the received rectangular images. Furthermore, in step S1803 the image feature amount extraction unit 1700 calculates the average position of the positions of the maximum values in the matrices by making the aforementioned convolution integral calculations.

In step S1804, the image feature amount extraction unit 1700 calculates the predicted value. If the above example is used as the method of calculating the predicted value, the accumulated value described in the second embodiment is calculated until the step number S=10. When S=10, the predicted value is calculated using the accumulated values at the respective timings of S=0, 1, 2, ..., 10.

If this predicted value is less than the threshold, this processing ends via step S1805. That is, if it is predicted that the accumulated value of the maximum values for all the matrices will not reach the predetermined threshold, it is determined that it is no use doing any more processing, thus ending the processing.

On the other hand, if the predicted value is equal to or larger than the threshold, the process advances to step S1806 via step S1805. In step S1806, the image feature amount extraction unit 1700 calculates the accumulated value of the maximum values for all the matrices as an image feature amount.

If the image feature amount is lower than the threshold, this processing ends via step S1807. On the other hand, if the feature amount is equal to or larger than the threshold, the process advances to step S1808 via step S1807. In step S1808, the image feature amount extraction unit 1700 sets the average position calculated in step S1802 as a new extraction position. In step S1809, the division unit 1002 executes processing for dividing the binary image into a plurality of rectangular images using the new extraction position again.

If the determination result received from the threshold determination unit 1004 indicates that "the bit expression patterns are embedded in the image to be processed", the information extraction unit 1005 specifies a bit expression pattern that forms one tile by performing pattern matching between each rectangular image that forms the piled patterns received from the image feature amount extraction unit 1700 and templates saved in the template memory 1603 in step S1810.

Needless to say, the computer having the arrangement shown in FIG. 6 can be applied to the extracting device according to this embodiment.

According to the second and third embodiments described above, the presence/absence determination of embedding information and extraction position adjustment can be implemented by fewer resources by commonizing some processes. As for the presence/absence determination of embedding information, determination can be made in a shorter period of time by predicting the image feature amount.

Other Embodiments

The objects of the present invention can be achieved as follows. That is, a recording medium (or storage medium), which records a program code of software that can implement the functions of the above-mentioned embodiments is supplied to a system or apparatus. A computer (or a CPU or MPU) of the system or apparatus reads out and executes the program code stored in the recording medium. In this case, the program code itself read out from the recording medium implements the functions of the above-mentioned embodiments, and the recording medium which records the program code constitutes the present invention.

When the computer executes the readout program code, an operating system (OS) or the like running on the computer performs some or all of actual processing operations based on an instruction of the program code. The present invention also includes a case wherein the functions of the above-mentioned embodiments are implemented by this processing.

Furthermore, assume that the program code read out from the recording medium is written in a memory of a function extension card or a function extension unit, which is inserted in or connected to the computer. After that, the functions of the above-mentioned embodiments are implemented by some or all of actual processing operations executed by a CPU or the like arranged in the function extension card or function extension unit based on an instruction of the program code. Such case is also included in the present invention.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Applications No. 2005-339211, filed Nov. 24, 2005 and No. 2006-152762, filed May 31, 2006, which are hereby incorporated by reference herein in their entirety.

What is claimed is:

1. An image processing apparatus for specifying positions of a plurality of types of patterns from a target image on which the respective patterns are laid out at a given interval, comprising:
   a division unit that obtains a plurality of divided images by dividing the target image at the given interval so that the divided images do not overlap each other;
   a pile unit that piles up the plurality of divided images obtained by said division unit so as to obtain a piled image;
   a generating unit that generates a position alignment pattern by compositing the plurality of types of patterns; and
   a specifying unit that specifies positions of the plurality of types of patterns in the target image on the basis of the position alignment pattern and the piled image that is obtained by said pile unit.

2. The image processing apparatus according to claim 1, wherein the plurality of types of patterns are bit representation patterns, which are different from each other.

3. The image processing apparatus according to claim 1, wherein said generating unit generates the position alignment pattern by compositing the plurality of types of patterns by way of a logical sum compositing thereof.

4. An image processing method for specifying positions of a plurality of types of patterns from a target image on which the respective patterns are laid out at a given interval said method comprising:
   using a computer to perform the following steps
      a division step of obtaining a plurality of divided images by dividing the target image at the given interval so that the divided images do not overlap each other;
      a pile step of piling up the plurality of divided images obtained in the division step so as to obtain a piled image;
   a generating step of generating a position alignment pattern by compositing the plurality of types of patterns; and a specifying step of specifying positions of the plurality of types of patterns in the target image on the basis of the position alignment pattern and the piled image obtained in the pile step.

5. The image processing method according to claim 4, wherein the plurality of types of patterns are bit representation patterns, which are different from each other.

6. The image processing method according to claim 4, wherein the generating step includes a step of generating the position alignment pattern by compositing the plurality of types of patterns by way of a logical sum compositing thereof.

7. A computer-readable storage medium storing the program for causing a computer to execute the image processing method according to claim 4.

8. A system for specifying positions of a plurality of types of patterns from a target image on which the respective patterns are laid out at a given interval, comprising:

a division unit that obtain a plurality of divided images by dividing the target image at the given interval so that the divided images do not overlap each other;

a pile unit that piles up the plurality of divided images obtained by said division unit so as to obtain a piled image;

a generating unit that generates a position alignment pattern by compositing the plurality of types of patterns; and a specifying unit that specifies positions of the plurality of types of patterns in the target image on the basis of the position alignment pattern and the piled image that is obtained by said pile unit.

9. The system according to claim 8, wherein the plurality of types of patterns are bit representation patterns, which are different from each other.

10. The system according to claim 8, wherein said generating unit generates the position alignment pattern by compositing the plurality of types of patterns by way of a logical sum compositing thereof.

* * * * *